United States Patent
Gu et al.

(10) Patent No.: US 12,316,154 B2
(45) Date of Patent: May 27, 2025

(54) ELECTRONIC DEVICE STABILIZING OUTPUT CURRENT OF CHARGING CIRCUIT AND CONTROLLING METHOD THEREOF

(71) Applicant: SAMSUNG ELECTRONICS CO., LTD., Suwon-si (KR)

(72) Inventors: Beomwoo Gu, Suwon-si (KR); Jaehyun Park, Suwon-si (KR); Kangho Byun, Suwon-si (KR); Jaesun Shin, Suwon-si (KR); Chongmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 815 days.

(21) Appl. No.: 17/553,233

(22) Filed: Dec. 16, 2021

(65) Prior Publication Data

US 2022/0190621 A1 Jun. 16, 2022

Related U.S. Application Data

(63) Continuation of application No. PCT/KR2021/018641, filed on Dec. 9, 2021.

(30) Foreign Application Priority Data

Dec. 16, 2020 (KR) .................. 10-2020-0176512

(51) Int. Cl.
*H02J 7/00* (2006.01)
*H02J 7/02* (2016.01)
(Continued)

(52) U.S. Cl.
CPC ...... *H02J 7/00714* (2020.01); *H02J 7/00034* (2020.01); *H02J 7/02* (2013.01);
(Continued)

(58) Field of Classification Search
CPC ...... H02J 7/00714; H02J 7/00034; H02J 7/02; H02J 50/12; H02J 50/80; H02J 50/10; H02J 50/70
See application file for complete search history.

(56) References Cited

U.S. PATENT DOCUMENTS

| 2011/0285210 A1 | 11/2011 | Lemmens et al. |
| 2013/0049483 A1 | 2/2013 | Kim et al. |

(Continued)

FOREIGN PATENT DOCUMENTS

| CN | 106786897 | 5/2017 |
| JP | 2019-162023 | 9/2019 |

(Continued)

OTHER PUBLICATIONS

International Search Report and Written Opinion dated Mar. 21, 2022 in corresponding International Application No. PCT/KR2021/018641.

(Continued)

*Primary Examiner* — David V Henze-Gongola
(74) *Attorney, Agent, or Firm* — Nixon & Vanderhye, P.C.

(57) ABSTRACT

Provided is an electronic device including: a battery, a resonant circuit including a coil and a capacitor configured to wirelessly receive power, a rectifying circuit configured to rectify an alternating current power provided from the resonant circuit to a direct current power, a DC/DC converter configured to convert the direct current power provided from the rectifying circuit and to output the converted direct current power, a charging circuit configured to charge the battery using the converted direct current power provided form the DC/DC converter, a controller, and a communication circuit, wherein the controller is configured to: control the charging circuit to set a magnitude of a reference current of the charging circuit to a first value, the first value (Continued)

being less than a maximum value of an output current of the charging circuit, control the charging circuit to set the magnitude of the reference current to a second value greater than the first value, measure a magnitude of an output current of the charging circuit after setting the magnitude of the reference current to the second value, control, based on a difference between the measured magnitude and the second value being less than or equal to a specified set value, the charging circuit to set the magnitude of the reference current to a third value greater than the second value, and control, based on the difference between the measured magnitude and the second value exceeding the specified set value, the charging circuit to set the magnitude of the reference current to the first value to receive wireless power.

20 Claims, 10 Drawing Sheets

(51) Int. Cl.
  *H02J 50/12* (2016.01)
  *H02J 50/80* (2016.01)
(52) U.S. Cl.
  CPC .............. *H02J 50/12* (2016.02); *H02J 50/80* (2016.02); *H02J 2207/20* (2020.01)

(56) References Cited

U.S. PATENT DOCUMENTS

| | | | |
|---|---|---|---|
| 2013/0342024 A1 | 12/2013 | Byun et al. | |
| 2014/0084701 A1* | 3/2014 | Bae | H02J 50/80 307/104 |
| 2014/0347008 A1* | 11/2014 | Chae | H02J 50/12 320/108 |
| 2016/0241083 A1 | 8/2016 | He et al. | |
| 2016/0308397 A1 | 10/2016 | Jung et al. | |
| 2016/0336804 A1 | 11/2016 | Son et al. | |
| 2018/0034305 A1 | 2/2018 | Lee et al. | |
| 2020/0091780 A1 | 3/2020 | Lee et al. | |
| 2020/0185979 A1 | 6/2020 | Park et al. | |
| 2020/0313424 A1 | 10/2020 | Woo et al. | |

FOREIGN PATENT DOCUMENTS

| | | |
|---|---|---|
| KR | 10-2010-0098715 | 9/2010 |
| KR | 10-2012-0133080 | 12/2012 |
| KR | 10-2013-0022036 | 3/2013 |
| KR | 10-2013-0142861 | 12/2013 |
| KR | 10-2014-0040570 | 4/2014 |
| KR | 10-2014-0067443 | 6/2014 |
| KR | 10-2014-0100187 | 8/2014 |
| KR | 10-2015-0093588 | 8/2015 |
| KR | 10-2016-0105798 | 9/2016 |
| KR | 10-2018-0013280 | 2/2018 |
| KR | 10-2020-0032421 | 3/2020 |
| KR | 10-2020-0069829 | 6/2020 |
| KR | 10-2020-0113864 | 10/2020 |

OTHER PUBLICATIONS

Korean Office Action issued Dec. 6, 2024 in corresponding Korean Patent Application No. 10-2020-0176512.

* cited by examiner

ELECTRONIC DEVICE STABILIZING OUTPUT CURRENT OF CHARGING CIRCUIT AND CONTROLLING METHOD THEREOF

CROSS-REFERENCE TO RELATED APPLICATIONS

This application is a continuation of International Application No. PCT/KR2021/018641 designating the United States, filed on Dec. 9, 2021, in the Korean Intellectual Property Receiving Office and claiming priority to Korean Patent Application No. 10-2020-0176512, filed on Dec. 16, 2020, in the Korean Intellectual Property Office, the disclosures of which are incorporated by reference herein in their entireties.

BACKGROUND

Field

The present disclosure relates to an electronic device for stabilizing the output current of a charging circuit and a controlling method thereof.

Description of Related Art

As wireless charging technology is developed, research on a method of supplying power and charging various electronic devices using a single charging device is being conducted.

Wireless charging technology is based on wireless power transmission or reception. For example, this is a system that automatically charges a battery when an electronic device is merely left on a charging pad without a separate connection to a charging connector.

The wireless charging technology includes an electromagnetic inductive scheme using a coil, a resonant scheme using resonance, and an RF/micro wave radiation scheme that converts electric energy into microwaves and transfers the same.

A power transmission method using wireless charging may be a scheme of transmitting power between a first coil of a transmission end and a second coil of a reception end. A magnetic field is produced in the transmission end and a current is induced or resonant in the reception end according to a change in the magnetic field, and thus, energy is produced.

Wireless charging technology using an electromagnetic inductive scheme or a magnetic resonant scheme are popularized among electronic devices such as smartphones. If a power transmitting unit (PTU) (e.g., a wireless charging pad) and a power receiving unit (PRU) (e.g., a smart phone) are in contact or approach within a predetermined distance, electromagnetic induction or electromagnetic resonance may occur between a transmission coil of the power transmitting unit and a reception coil of the power receiving unit, and the battery of the power receiving unit may be charged.

A wireless power transmitting unit performs impedance matching and may wirelessly output power via a resonant circuit, and a wireless power receiving unit (hereinafter, an electronic device) may wirelessly receive output power. Due to a change in the distance between the electronic device and the wireless power transmitting unit or other reasons, power that the electronic device wirelessly receives may be decreased. If power (or current) that the charging circuit (e.g., a charger) of the electronic device provides to a load (e.g., a battery) exceeds power that the electronic device receives from the wireless power transmitting unit, a phenomenon (e.g., oscillation) in which a current that the charging circuit provides to the battery oscillates (e.g., temporarily increases and/or decreases) may occur. Accordingly, the efficiency of power transmitted to the battery may be decreased.

SUMMARY

Embodiments of the disclosure may provide an electronic device and a controlling method thereof which control a current output from a charging circuit if a phenomenon in which a current (hereinafter, an output current) provided from the charging circuit to a battery oscillates is expected to occur.

Embodiments of the disclosure may provide an electronic device that controls a current (hereinafter, a reference current) sent to a charging circuit in order to measure an output current and to control an output current, and a control method thereof.

In accordance with an example embodiment of the disclosure, an electronic device includes: a battery, a resonant circuit including a coil and a capacitor configured to wirelessly receive power, a rectifying circuit configured to rectify an alternating current power provided from the resonant circuit to a direct current power, a DC/DC converter configured to convert the direct current power provided from the rectifying circuit and to output the converted direct current power, a charging circuit configured to charge the battery using the converted direct current power provided form the DC/DC converter, a controller, and a communication circuit, wherein the controller is configured to: control the charging circuit to set the magnitude of a reference current of the charging circuit to a first value, the first value being less than a maximum value of an output current of the charging circuit, control the charging circuit to set the magnitude of the reference current to a second value greater than the first value, measure the magnitude of an output current of the charging circuit after setting the magnitude of the reference current to the second value, control, based on the difference between the measured magnitude and the second value being less than or equal to a specified set value, the charging circuit to set the magnitude of the reference current to a third value greater than the second value, and control, based on the difference between the measured magnitude and the second value exceeding the specified set value, the charging circuit to set the magnitude of the reference current to the first value to receive wireless power.

In accordance with an example embodiment of the disclosure, a method of controlling an electronic device may include: controlling a charging circuit to set a magnitude of a reference current of a charging circuit of the electronic device to a first value, the first value being less than a maximum value of an output current of the charging circuit, controlling the charging circuit to set a magnitude of the reference current to a second value greater than the first value, measuring the magnitude of an output current of the charging circuit after setting the magnitude of the reference current to the second value, controlling, based on the difference between the measured magnitude and the second value being less than or equal to a specified set value, the charging circuit to set the magnitude of the reference current to a third value greater than the second value, and controlling, based on the difference between the measured magnitude and the second value exceeding the specified set value, the charging circuit to set the magnitude of the reference current to the first value to receive wireless power.

In accordance with an example embodiment of the disclosure, an electronic device may include: a battery, a resonant circuit including a coil and a capacitor configured to wirelessly receive power, a rectifying circuit configured to rectify an alternating current power provided from the resonant circuit to a direct current power, a DC/DC converter configured to convert the direct current power provided from the rectifying circuit and output the converted direct current power, a charging circuit configured to charge the battery using the converted direct current power provided from the DC/DC converter, a controller, and a communication circuit, wherein the controller is configured to: transmit a reference current to the charging circuit, to identify a magnitude of an output current of the charging circuit measured while the reference current is transmitted, based on increase and decrease of the output current being repeated based on the magnitude of the reference current being increased, transmit a reference current having a decreased magnitude to the charging circuit, and based on increase and decrease of the output current not being repeated based on the magnitude of the reference current being increased, transmit a reference current having an increased magnitude to the charging circuit.

According to various example embodiments, an electronic device can prevent and/or reduce a phenomenon in which an output current oscillates, thereby increasing the efficiency of power that charges a battery.

According to various example embodiments, an electronic device can determine a reference current which does not cause a phenomenon in which an output current oscillates, and can increase the efficiency of power that charges a battery.

Various effects obtained by the disclosure are not limited to the above-described effects.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1A:
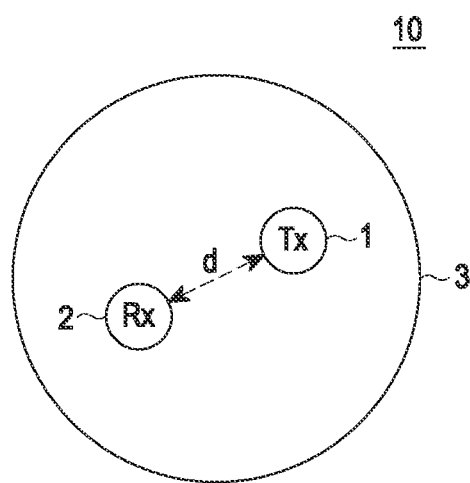
FIG. 1A is a diagram illustrating an example wireless power transceiving system according to various embodiments.

FIG. 1A is a diagram illustrating an example wireless power transceiving system 10 according to various embodiments.

According to various embodiments, the wireless power transceiving system 10 may include a wireless power transmitting unit (e.g., including wireless power transmitting circuitry) 1. The wireless power transceiving system 10 may include an electronic device 2 that wirelessly receives power from the wireless power transmitting unit 1. The electronic device 2 may be also referred to as a wireless power receiver in terms of the electronic device 2 being capable of wirelessly receiving power.

According to various embodiments, the wireless power transmitting unit 1 may include various wireless power transmitting circuitry and wirelessly transmit power to at least one electronic device 2. The wireless power transmitting unit 1 may transmit power to the electronic device 2 according to various wireless charging schemes.

For example, the wireless power transmitting unit 1 may transmit power according to a resonant scheme. In the case of the resonant scheme, the wireless power transmitting unit 1 may include, for example, a power source, a DC-AC converting circuit (or an amplifying circuit), an impedance matching circuit, at least one capacitor, at least one coil, an out-band communication circuit (e.g., a Bluetooth low energy (BLE) communication circuit), or the like. A resonant circuit may include at least one capacitor and at least one coil. The wireless power transmitting unit 1 may be embodied according to, for example, a scheme defined in the alliance for wireless power (A4WP) standard (or the air fuel alliance (AFA) standard). The wireless power transmitting unit 1 may include a coil that induces a magnetic field when a current (e.g., an alternating current) flows according to a resonant scheme or an inductive scheme. A process in which the wireless power transmitting unit 1 produces a magnetic field via a coil may be expressed as a process of outputting wireless power, and a process in which an electromotive force is induced in the electronic device 2 based on the produced magnetic field may be expressed as a process of receiving wireless power. It is expressed that the wireless power transmitting unit 1 wirelessly transmits power to the electronic device 2 via the above-described processes. In addition, the electronic device 2 may include a coil that induces an electromotive force based on the magnitude of a magnetic field that is formed therearound and varies over time. A process in which, when the electromotive force is induced in a coil, the coil outputs an alternating current or an alternating current is provided to the coil may be expressed as a process in which the electronic device 2 wirelessly receives power.

As another example, the wireless power transmitting unit 1 may transmit power according to an electromagnetic wave scheme. In the case in which the wireless power transmitting unit 1 operates according to the electromagnetic wave scheme, the wireless power transmitting unit 1 may include, for example, a power source, an DC-AC converting circuit (or an amplifying circuit), a distribution circuit, a phase shifter, a power transmitting antenna array including a plurality of antennas (e.g., a patch antenna, a dipole antenna, and/or a monopole antenna), an out-band based communication circuit (e.g., a BLE communication module), and the like. Each of the plurality of antennas may form a radio frequency (RF) wave. The wireless power transmitting unit 1 may perform beamforming by adjusting the phase and/or amplitude of an electric signal input for each antenna. The electronic device 2 may include an antenna capable of outputting a current using an RF wave formed therearound. A process in which the wireless power transmitting unit 1 forms an RF wave may be expressed as a process in which the wireless power transmitting unit 1 wirelessly transmits power. A process in which the electronic device 2 outputs a current from an antenna using an RF wave may be expressed as a process in which the electronic device 2 wirelessly receives power.

For example, the wireless power transmitting unit 1 may transmit power according to the inductive scheme. In the case in which the wireless power transmitting unit 1 operates the inductive scheme, the wireless power transmitting unit 1 may include, for example, a power source, a DC-AC converting circuit (or an amplifying circuit), an impedance matching circuit, at least one capacitor, at least one coil, a communication modulation/demodulation circuit, and the like. A resonant circuit may include at least one capacitor and at least one coil. The wireless power transmitting unit 1 may be embodied according to a scheme defined in the wireless power consortium (WPC) standard (or the Qi standard).

According to various embodiments, the wireless power transmitting unit 1 may communicate with the electronic device 2. For example, the wireless power transmitting unit 1 may communicate with the electronic device 2 according to in-band scheme. The wireless power transmitting unit 1 or the electronic device 2 may change a load (or impedance) according to a data modulation scheme for data desired to be transmitted, for example, an on/off keying modulation scheme. The wireless power transmitting unit 1 or the electronic device 2 may measure a change in load (or impedance) based on a change in the magnitude of the current, voltage, or power of the coil, and may determine data to be transmitted from a counterpart device. For example, the wireless power transmitting unit 1 may communicate with the electronic device 2 according to an out-band scheme. The wireless power transmitting unit 1 or the electronic device 2 may transmit or receive data using a communication circuit (e.g., a BLE communication module) contained separately from a coil, patch, or antenna. The wireless power transmitting unit 1 may transmit media data, or each of a plurality of different communication circuits (e.g., a BLE communication module, a Wi-Fi module, and a Wi-gig module) may transmit or receive media data or a wireless power transmission/reception control signal.

Referring to FIG. 1A, according to various embodiments, the electronic device 2 may be located in (or may enter) a chargeable area 3 of the wireless power transmitting unit 1. According to various embodiments, the electronic device 2 may wirelessly receive power from the wireless power transmitting unit 1. According to various embodiments, the electronic device 2 may process (e.g., rectify or convert (or regulate)) power which is output when a voltage is induced in the included coil, and may transfer the processed power to the load of the electronic device 2 (e.g., a battery or a charger (hereinafter a charging circuit) for charging a battery).

According to an embodiment, the wireless power transmitting unit 1 may perform impedance matching, and may transfer the power to the electronic device 2 via the coil. The wireless power transmitting unit 1 may perform impedance matching with respect to impedance towards the electronic device 2. If the distance d between the electronic device 2 and the wireless power transmitting unit 1 changes, the impedance towards the electronic device 2 may change. Accordingly, power that the electronic device 2 receives is decreased and power transferred to the load (e.g., the charging circuit) may be decreased.

According to an embodiment, if another electronic device (not illustrated) enters the chargeable area 3 or an obstacle (e.g., a metallic material) is disposed around the electronic device 2, power that the resonant circuit of the electronic device 2 receives may be decreased. Accordingly, power transferred to the load (e.g., the charging circuit) may be decreased. As another example, if wireless power output from the wireless power transmitting unit 1 is decreased according to control performed by the wireless power transmitting unit 1, power that the resonant circuit of the electronic device 2 receives may be decreased. Accordingly, power transferred to the load (e.g., the charging circuit) may be decreased.

Due to the above-described reasons and/or other reasons, power transferred to the load (e.g., the charging circuit) may be decreased, and a voltage at the front end of a charging circuit (e.g., the output voltage ($V_{rec}$) of the rectifying circuit) may be decreased to be less than or equal to a voltage needed for operation of the charging circuit.

If power (or a current) that the charging circuit outputs to the battery exceeds the maximum power (hereinafter, maximum transmission power) that the resonant circuit is capable of receiving, a phenomenon (e.g., oscillation) in which a current (e.g., an output current) output from the charging circuit oscillates may occur. Accordingly, the efficiency of power transferred to the battery may be decreased.

According to various example embodiments, the electronic device 2 may control the charging circuit, and may control the magnitude of the output current output from the charging circuit.

According to various example embodiments, the electronic device 2 may increase the output current, and may increase power transferred to the battery.

According to various example embodiments, if the difference between the measured output current and a reference or control value (e.g., a reference current) exceeds a predetermined (e.g., specified) value, the electronic device 2 may decrease the reference value for the output current, so as to prevent and/or reduce a decrease in the efficiency of power transferred to the battery.

Figure 1B:
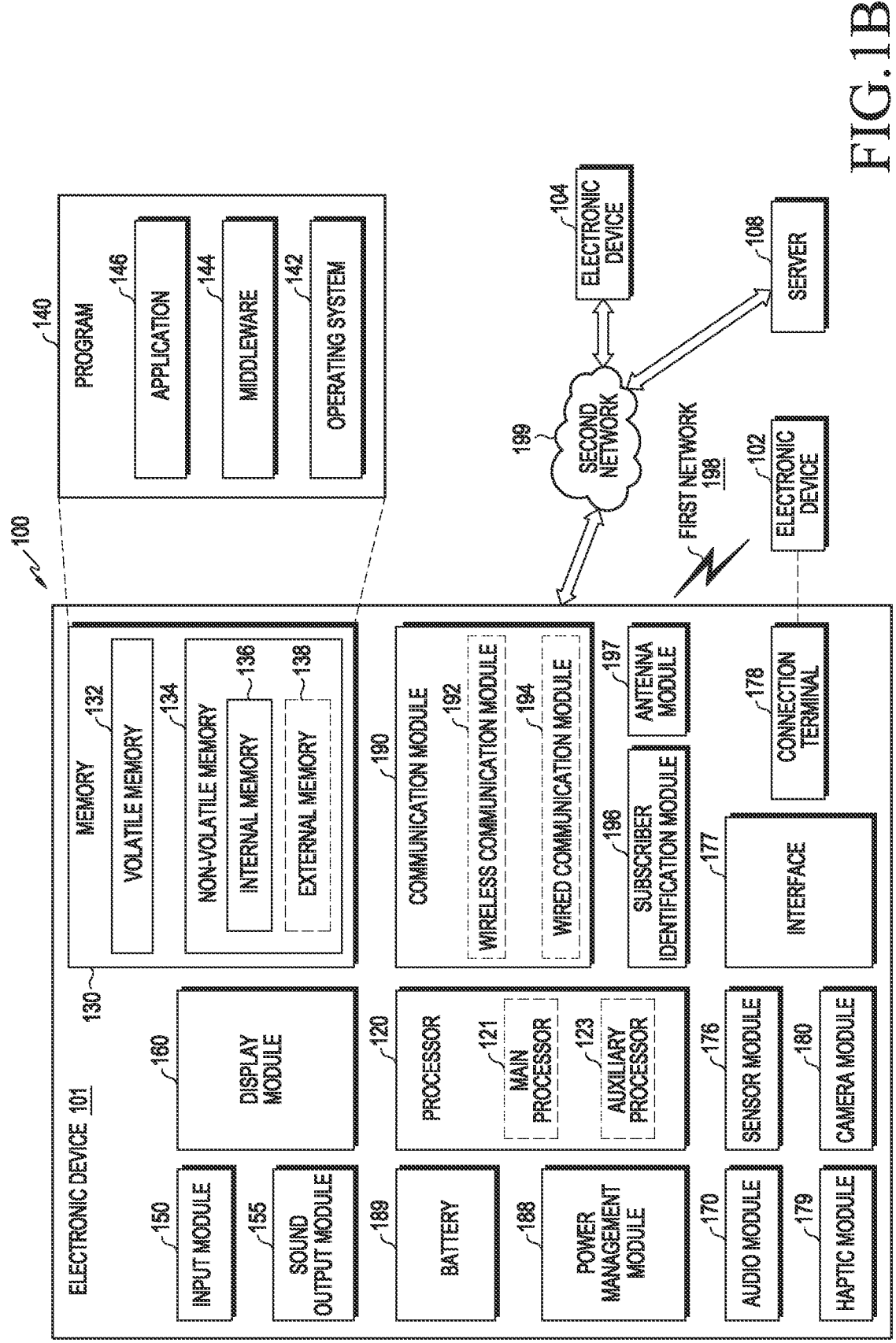
FIG. 1B is a block diagram illustrating an example electronic device in a network environment according to various embodiments.

FIG. 1B is a block diagram illustrating an example electronic device 101 in a network environment 100 according to various embodiments.

Referring to FIG. 1B, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
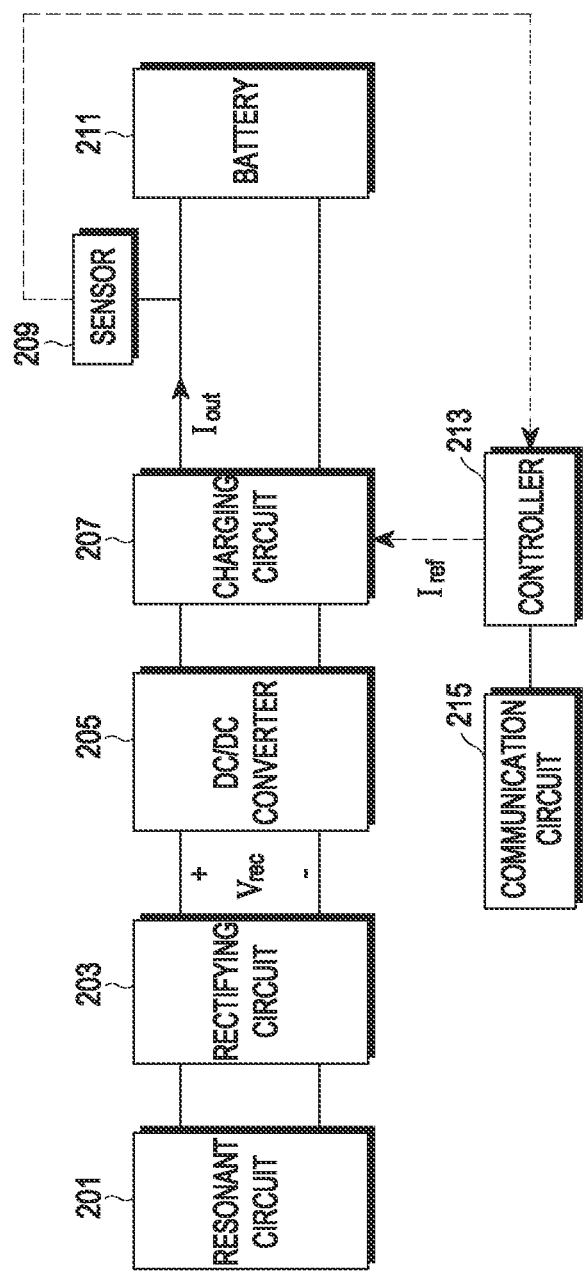
FIG. 2 is a block diagram illustrating an example configuration of an electronic device according to various embodiments.

FIG. 2 is a block diagram illustrating an example configuration of the electronic device 101 (e.g., the electronic device 2 of FIG. 1A) according to various embodiments.

According to various embodiments, the electronic device 101 may include a resonant circuit 201, a rectifying circuit (e.g., a rectifier) 203, a DC/DC converter 205, a charging circuit 207, a sensor 209 (e.g., the sensor module 176 of FIG. 1B), a battery 211 (e.g., the battery 189 of FIG. 1B), a controller (e.g., including processing circuitry) 213 (e.g., the processor 120 of FIG. 1B), and/or the communication circuit 215 (e.g., the communication module 190 of FIG. 1B).

According to various embodiments, in the resonant circuit 201, power may be produced based on a magnetic field and/or electric field formed by a wireless power transmitting unit (e.g., the wireless power transmitting unit 1 of FIG. 1A). An alternating current power may be produced in the resonant circuit 201, and the alternating current power may be transferred to the rectifying circuit 203. The resonant circuit 201 may include at least one coil and at least one capacitor. The configuration in which at least one coil and at least one capacitor are connected is not limited.

According to various embodiments, the rectifying circuit 203 may rectify an alternating current power provided from the resonant circuit 201 to a direct current power. According to various embodiments, the rectifying circuit 203 may include a bridge circuit (e.g., a full-bridge circuit or a half-bridge circuit). According to various embodiments, the rectifying circuit 203 may be controlled by the controller 213. For example, if the rectifier is embodied as a bridge circuit, the on/off state of a device (e.g., a switch or a transistor) of the bridge circuit may be controlled by the controller 213.

According to various embodiments, the DC/DC converter 205 may convert or regulate a rectifying voltage received from the rectifying circuit 203. According to various embodiments, the DC/DC converter 205 may provide power having a substantially constant voltage. According to various embodiments, the DC/DC converter 205 may not be included in the electronic device 101 depending on the implementation. In an embodiment that excludes the DC/DC converter 205, the expression "provided as the DC/DC converter 205" mentioned in the disclosure may be understood as the expression "provided as the charging circuit 207". The expression "provided from the DC/DC converter 205" may be understood as the expression "provided from the rectifying circuit 203". According to various embodiments, the DC/DC converter 205 may be connected to at least one piece of hardware (or a power management integrated circuit (PMIC) for providing power to at least one piece of hardware) in addition to the charging circuit 207, and the at least one piece of hardware (or the PMIC) may operate using power from the DC/DC converter 205. According to various embodiments, the at least one piece of hardware may be connected to an individual PMIC, respectively, or the at least one piece of hardware may operate using power provided via the corresponding PMIC. According to various embodiments, the DC/DC converter 205 may be embodied as one or more DC/DC converters, and the number of the DC/DC converts may not be limited. According to various embodiments, the DC/DC converter 205 may include a low-dropout regulator.

According to various embodiments, the charging circuit 207 may receive power output from the DC/DC converter 205, and may charge the battery 211 connected to the charging circuit 207 using the received power. According to an embodiment, the charging circuit 207 may control current and/or voltage provided to the battery 211 based on various charging modes (e.g., a constant current (CC) mode, a constant voltage (CV) mode, a fast charging mode, or the like). For example, based on the charged state of the battery 211, the charging circuit 207 may control a current (e.g., an output current ($I_{out}$) for charging the battery 211) and/or a voltage provided to the battery 211. As another example, the charging circuit 207 may control a current and/or a voltage provided to the battery 215 based on a user input. For example, if a fast charging mode is selected based on a user input, the charging circuit 207 may control a current and/or a voltage based on settings corresponding to the fast charging mode. According to various embodiments, a current (e.g., an output current ($I_{out}$)) provided from the charging circuit 207 to the battery 211 may be determined based on a control signal (e.g., a reference current ($I_{ref}$)) that the controller 213 sends (e.g., transmits). For example, the magnitude of an output current ($I_{out}$) may have a value corresponding to (e.g., proportional to) the magnitude of a reference current ($I_{ref}$) of the control signal. According to various embodiments, the charging circuit 207 may control, for example, a pulse width modulation (PWM) signal input into a gate terminal of a transistor, and may adjust the magnitude (e.g., strength) of an output current ($I_{out}$). According to various embodiments, as the magnitude of an output current ($I_{out}$) is increased in response to increase in a reference current ($I_{ref}$) sent to (e.g., received by) the charging circuit 207, the magnitude of a voltage at the front end of the charging circuit 207 may be decreased. If the reference current ($I_{ref}$) sent to (e.g., received by) the charging circuit 207 is greater than or equal to a threshold value, the magnitude of a voltage at the front end of the charging circuit 207 may be decreased to be less than a low limit value needed for operation of the charging circuit 207 (e.g., a switch (not illustrated) included in the charging circuit 207). The threshold value may be determined based on a voltage (e.g., a rectifying voltage ($V_{rec}$)) at the output end of the rectifying circuit 203 while the reference current ($I_{ref}$) is received by the charging circuit 207. For example, if the rectifying voltage ($V_{rec}$) is low, the threshold value may be set to a low value. If the rectifying voltage ($V_{rec}$) is high, the threshold value may be set to a high value. The charging circuit 207 may be changed to an off state when the magnitude of a voltage at the front end of the charging circuit 207 is decreased to be less than a low limit value needed for operation of the charging circuit 207 (e.g., a switch (not illustrated) included in the charging circuit 207). When the charging circuit 207 is changed to the off state, the output current ($I_{out}$) may be instantaneously decreased. When the output current ($I_{out}$) is decreased, the magnitude of the voltage at the front end of the charging circuit 207 may be increased. If the magnitude of the voltage at the front end of the charging circuit 207 is increased to be greater than or equal to a low limit value needed for operation of the charging circuit 207, the charging circuit 207 may be changed to an on state. When the charging circuit 207 is changed to the on state, the output current ($I_{out}$) may be instantaneously increased. According to an embodiment, a switch (not illustrated) which may not be included in the charging circuit 207 (e.g., disposed outside) may be changed to an off state when an output current ($I_{out}$) is increased, and may be changed to an on state when the output current ($I_{out}$) is decreased. For example, the switch (not illustrated) disposed outside may be changed to an on state or off state according to control performed by a comparator which has a hysteresis feature based on a voltage (e.g., a rectifying voltage ($V_{rec}$)) at the output end of the rectifying circuit. For example, the comparator may include an inverter in the output end. The comparator may control the switch (not illustrated) to be an off state when the rectifying voltage ($V_{rec}$) is increased to exceed a first threshold value, and may control the switch (not illustrated) to be an on state when the rectifying voltage ($V_{rec}$) is decreased to be less than or equal to a second threshold value. As described above, when the charging circuit 207 and/or the switch (not illustrated) disposed outside the charging circuit 207 is changed to an on state or off state, a phenomenon (e.g., oscillation) in which an output current ($I_{out}$) oscillates may occur. The charging circuit 207 may provide a voltage corresponding to the charged state of the battery 211 to the battery 211, and the average value of power provided to the battery 211 while a phenomenon (e.g., oscillation) in which an output current ($I_{out}$) oscillates occurs may be less than the average value of power provided to the battery 211 while a phenomenon (oscillation) in which an output current ($I_{out}$) oscillates does not occur. In other words, in the state in which an output current ($I_{out}$) provided to the battery 211 is determined to be output in a magnitude corresponding to the magnitude of a reference current ($I_{ref}$), if the magnitude of an output current ($I_{out}$) that is actually output is repeatedly and rapidly increased and decreased, the average value of power provided to the battery 211 may be decreased. Accordingly, the efficiency of power provided to the battery 211 may be decreased.

According to various embodiments, the electronic device 101 may include a PMIC, and the charging circuit 207 may be embodied in a form that is included in the PMIC. According to an embodiment, the charging circuit 207 may be embodied in a form that is not included in the PMIC (e.g., in a form of being disposed outside the PMIC).

According to various embodiments, the battery 211 may be a chargeable secondary battery, the type of the battery 211 is not limited.

According to various embodiments, the controller 213 may include various processing circuitry and control an output current ($I_{out}$) of the charging circuit 207. The controller 213 may transmit, to the charging circuit 207, a control signal (e.g., a reference current ($I_{ref}$)) for controlling the magnitude of an output current ($I_{out}$). For example, the controller 213 may transmit control signals having different voltage magnitudes (proportional to the set value of the reference current ($I_{ref}$)) using a buck converter disposed inside or outside the controller 213. The magnitude of an output current ($I_{out}$) may be controlled by the set value of the received control signal (e.g., the magnitude of the reference current ($I_{ref}$)). For example, the controller 213 may increase the magnitude of an output current ($I_{out}$) by increasing a reference current ($I_{ref}$) of a control signal. The controller 213 may decrease the magnitude of an output current ($I_{out}$) by decreasing a reference current ($I_{ref}$) of a control signal. The charging circuit 207 may output an output current ($I_{out}$) in a magnitude corresponding to the magnitude of a reference current ($I_{ref}$). According to various embodiments, the magnitude of an output current ($I_{out}$) may be the same value as the magnitude of a reference current ($I_{ref}$).

According to various embodiments, based on the measured magnitude of an output current ($I_{out}$), the controller 213 may determine the magnitude of a reference current ($I_{ref}$) for controlling the charging circuit 207. For example, the controller 213 may send a control signal having a reference current ($I_{ref}$) of a first value to the charging circuit 207. In the disclosure, sending a control signal having a reference current ($I_{ref}$) of a predetermined (specified) value to the charging circuit 207 may be described as setting the reference current ($I_{ref}$) to a predetermined (specified) value or controlling the charging circuit 207 so as to set the reference current ($I_{ref}$) to a predetermined (specified) value. For example, the first value may be a value less than the maximum value of an output current ($I_{out}$) which the charging circuit 207 is capable of outputting. The controller 213 may determine the magnitude of a reference current ($I_{ref}$) to a second value so as to increase the magnitude of an output current ($I_{out}$), and may transmit a control signal having the reference current ($I_{ref}$) of a second value to the charging circuit 207. The controller 213 may measure an output current ($I_{out}$) output from the charging circuit 207 while transmitting the control signal having the reference current ($I_{ref}$) of a second value. For example, the controller 213 may measure (e.g., identify) the magnitude of an output current ($I_{out}$) output from the charging circuit 207, using a sensor (not illustrated) included in the charging circuit 207 or at least one sensor 209 (e.g., an ammeter) disposed outside the charging circuit 207 (e.g., disposed in the output end of the charging circuit 207). The controller 213 may compare the measured magnitude of the output current ($I_{out}$) and the magnitude of the reference current ($I_{ref}$) (e.g., the second value) of the control signal sent. For example, the controller 213 may measure (e.g., identify) the average measured magnitude (e.g., the average value) of the output current ($I_{out}$), and may compare the average measured magnitude of the output current ($I_{out}$) and the magnitude of the reference current ($I_{ref}$) (e.g., the second value). Based on a comparison result, if it is identified that the difference between the measured magnitude of the output current ($I_{out}$) and the magnitude of the reference current ($I_{ref}$) (e.g., the second value) of the control signal sent is less than or equal to a predetermined set value, the controller 213 may increase the magnitude of the reference current ($I_{ref}$) of the control signal sent to the charging circuit 207. For example, the controller 213 may determine the magnitude of the reference current ($I_{ref}$) to a third value which is greater than the second value, and may transmit a control signal having a reference current ($I_{ref}$) of the third value to the charging circuit 207. Based on a comparison result, the controller 213 may identify that the difference between the measured magnitude of the output current ($I_{out}$) and the magnitude of the reference current ($I_{ref}$)

(e.g., the second value) of the control signal sent exceeds a predetermined set value (e.g., the average magnitude of the output current ($I_{out}$) is at least a predetermined set value less than the magnitude of the reference current ($I_{out}$) (e.g., the second value)). For example, this may correspond to the case in which a phenomenon (e.g., oscillation) in which an output current ($I_{out}$) oscillates occurs when the magnitude of the output current ($I_{out}$) is increased in response to increase in a reference current ($I_{ref}$). Based on a comparison result, if it is identified that the difference between the measured magnitude of the output current ($I_{out}$) and the magnitude of the reference current ($I_{ref}$) (e.g., the second value) of the control signal sent exceeds a predetermined set value, the controller 213 may decrease the magnitude of the reference current ($I_{ref}$) of the control signal sent to the charging circuit 207. For example, the controller 213 may determine the magnitude of the reference current ($I_{ref}$) to be the magnitude (e.g., the first value) of a previous stage (e.g., before it is identified that the difference between the measured magnitude of the output current ($I_{out}$) and the magnitude of the reference current ($I_{ref}$) of the control signal sent exceeds a predetermined set value), and may transmit a control signal having a reference current ($I_{ref}$) corresponding to the first value to the charging circuit 207. The controller 213 may determine the magnitude of a reference current ($I_{ref}$) or may transmit a control signal having a reference current ($I_{ref}$) of a determined magnitude, may measure the magnitude of an output current ($I_{out}$), may compare again the measured magnitude of the output current ($I_{out}$) and the magnitude of the reference current ($I_{ref}$) of the control signal sent, and may increase or decrease, based on a comparison result, the magnitude of the reference current ($I_{ref}$) of the control signal sent to the charging circuit 207.

According to various embodiments, in the state of sending a control signal having a reference current ($I_{ref}$) having a determined magnitude to the charging circuit 207, the controller 213 may receive wireless power from the wireless power transmitting unit 1. Via an output current ($I_{out}$) that is output in the state of transmitting a control signal having a reference current ($I_{ref}$) having a determined magnitude to the charging circuit 207 according to the above-described method, power in the maximum magnitude that is capable of being provided to the battery 211 (hereinafter, a maximum receivable power) may be provided in the state of receiving wireless power of a constant magnitude from the wireless power transmitting unit 1. For example, the maximum receivable power may be identified as a product of the magnitude of a reference current ($I_{ref}$) (or the magnitude of an output current ($I_{out}$) determined by a reference current ($I_{ref}$)) and the magnitude of a voltage that the charging circuit 207 provides to the battery 211.

According to various embodiments, a control signal (e.g., a reference current ($I_{ref}$)) may be sent to the charging circuit 207 via inter-integrated circuit (IC) communication (e.g., I squared C ($I^2C$)), and a method of sending a control signal is not limited.

According to various embodiments, the controller 213 may be embodied as a microprocessor or a micro controlling unit (MCU), but is not limited thereto. According to various embodiments, the controller 213 may be embodied to include an analog device.

According to various embodiments, the communication circuit 215 may be embodied as, for example, a BLE communication circuit, but a communication scheme is not limited if the communication circuit is capable of transmitting/receiving a communication signal. According to various embodiments, the communication circuit 215 may transmit reception power information to the wireless power transmitting unit 1. For example, the reception power information may include information (e.g., the magnitude of an output current ($I_{out}$)) associated with a measured output current ($I_{out}$) of the charging circuit 207. As another example, the reception power information may include information indicating that a phenomenon (e.g., oscillation) in which an output current ($I_{out}$) oscillates occurs. According to various embodiments, according to control performed by the controller 213, the communication circuit 215 may transmit the reception power information based on the difference in magnitude between a measured output current ($I_{out}$) and a reference current ($I_{ref}$) sent to the charging circuit 207 exceeding a predetermined set value.

According to various embodiments, the sensor 209 may include a high-pass filter (HPF). According to various embodiments, if a phenomenon (e.g., oscillation) in which an output current ($I_{out}$) output from the charging circuit 207 oscillates occurs, a high frequency component of the output current ($I_{out}$) may pass the HPF. According to various embodiments, if it is identified that a high frequency component that passes the HPF (e.g., a high frequency component output from the HPF) is present, the controller 213 may identify that a phenomenon (e.g., oscillation) in which an output current oscillates ($I_{out}$) occurs. According to various embodiments, if it is identified that a phenomenon (e.g., oscillation) in which an output current ($I_{out}$) oscillates occurs, the controller 213 may decrease the magnitude of a reference current ($I_{ref}$) of a control signal sent to the charging circuit 207.

Figure 3A:
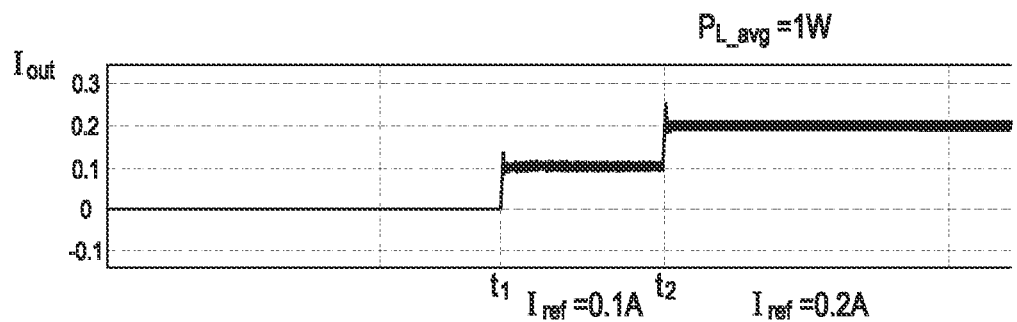
FIG. 3A is a graph illustrating an output current when a charging circuit stably outputs an output current according to various embodiments.
Figure 3B:
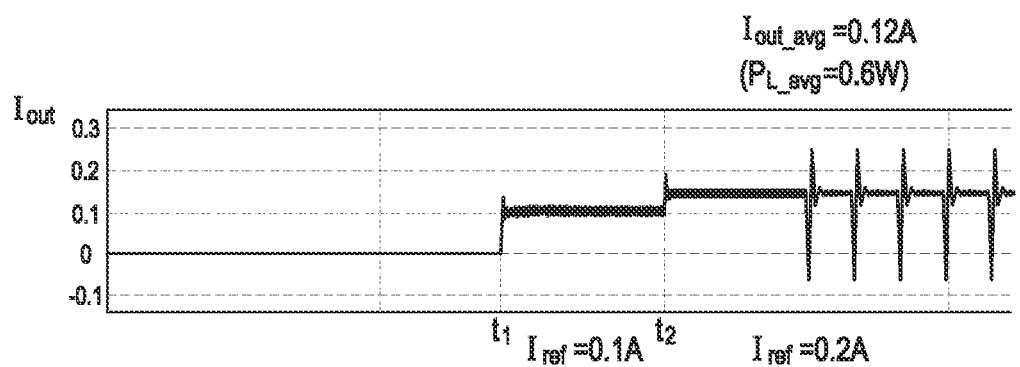
FIG. 3B is a graph illustrating an output current when an output current of a charging circuit oscillates according to various embodiments.

FIG. 3A is a graph illustrating an example output current ($I_{out}$) when a charging circuit (e.g., the charging circuit 207 of FIG. 2) stably outputs an output current (e.g., an output current ($I_{out}$) of FIG. 2) according to various embodiments. FIG. 3B is a graph illustrating an example output current ($I_{out}$) when an output current ($I_{out}$) of the charging circuit 207 oscillates (e.g., oscillation) according to various embodiments. Hereinafter, descriptions which have been provided with reference to the above-described drawings may not be repeated.

According to various embodiments, an electronic device (e.g., the electronic device 101 of FIG. 1B) may wirelessly receive power from a wireless power transmitting unit (e.g., the wireless power transmitting unit 1 of FIG. 1A). According to various embodiments, the charging circuit 207 of the electronic deice 101 may wirelessly receive power from the wireless power transmitting unit 1, may operate when a voltage (e.g., a rectifying voltage ($V_{rec}$) of FIG. 2) at the output end of a rectifying circuit (e.g., the rectifying circuit 203 of FIG. 2) is greater than or equal to a predetermined (specified) voltage (e.g., a voltage needed for operating the charging circuit 207), and may provide a voltage to a battery (e.g., the battery 211 of FIG. 2). According to various embodiments, the voltage provided to the battery 211 may be determined based on the charged state of the battery 211. For ease of description, on the assumption that a constant voltage (e.g., 5V) is provided to the battery 211, description is provided with reference to FIG. 3A and FIG. 3B. According to various embodiments, while wirelessly receiving power from the wireless power transmitting unit 1, the electronic device 101 may set, to a first value (e.g., 0.1 A), the magnitude of a reference current (e.g., the reference current ($I_{ref}$) of FIG. 2) sent to the charging circuit 207 at a first point ($t_1$), and may increase the magnitude to a second value (e.g., 0.2 A) at a second point ($t_2$). According to various embodiments, the charging circuit 207 of the electronic device 101 may be configured to provide, to the battery 211, an output current ($I_{out}$) corresponding to the set magnitude of the reference current ($I_{ref}$).

According to various embodiments, the charging circuit 207 may provide the output current ($I_{out}$) corresponding to the first value (e.g., 0.1 A) to the battery 211 in the interval from the first point ($t_1$) to the second point ($t_2$). According to various embodiments, at the second point ($t_2$), if the reference current ($I_{ref}$) is increased to the second value (e.g., 0.2 A), the charging circuit 207 may provide an output current ($I_{out}$) corresponding to the second value (e.g., 0.2 A) to the battery 211.

FIG. 3A illustrates the case in which the magnitude of power wirelessly received from the wireless power transmitting unit 1 is a first magnitude. For example, the first magnitude may be a value greater than or equal to power which is output to the battery 211 when the charging circuit 207 provides an output current ($I_{out}$) corresponding to the second value (e.g., 0.2 A) to the battery 211. According to various embodiments, a phenomenon in which the output current ($I_{out}$) oscillates does not occur in an interval after the second point ($t_2$), and the magnitude of power (e.g., an average power ($P_{L\_avg}$)) provided to the battery 211 may be approximately 1 W.

FIG. 3B illustrates the case in which the magnitude of power wirelessly received from the wireless power transmitting unit 1 is a second magnitude. For example, the second magnitude may be a value which is less than the first magnitude, and is less than power which is output to the battery 211 when the charging circuit 207 provides an output current ($I_{out}$) corresponding to the second value (e.g., 0.2 A) to the battery 211. According to various embodiments, in an interval after the second point ($t_2$), a phenomenon in which an output current ($I_{out}$) oscillates may occur, and the average value of an output current ($I_{out}$) is 0.12A which is less than the second value (e.g., 0.2 A) and the magnitude (e.g., the average power ($P_{L\_avg}$)) of power provided to the battery 211 may be approximately 0.6 W.

Referring to FIGS. 3A and 3B, if the magnitude of power wirelessly received from the wireless power transmitting unit 1 is greater than power which is output to the battery 211 based on a set value (e.g., the second value) of a reference current ($I_{ref}$), a phenomenon in which an output current ($I_{out}$) oscillates does not occur, and if the magnitude of power wirelessly received from the wireless power transmitting unit 1 is less than power which is output to the battery 211 based on the set value (e.g., the second value) of the reference current ($I_{ref}$), a phenomenon in which an output current ($I_{out}$) oscillates occurs and the average value of an output current ($I_{out}$) may be decreased to be less than the set value (e.g., the second value) of the reference current ($I_{ref}$). Accordingly, the magnitude (e.g., 0.6 W) of power provided to the battery 211 may be decreased to be less than the magnitude of power (e.g., approximately 1 W) when the phenomenon in which the output current ($I_{out}$) oscillates does not occur. According to various embodiments, if a phenomenon in which an output current ($I_{out}$) oscillates occurs when the reference current ($I_{ref}$) is increased from the first value (e.g., 0.1 A) to the second value (e.g., 0.2 A), the electronic device 1 may decrease the reference current ($I_{ref}$) to the set value (e.g., the first value) of a previous stage (e.g., the interval between t1 and t2) before occurrence of a phenomenon in which an output current ($I_{out}$) oscillates. According to various embodiments, if a phenomenon in which an output current ($I_{out}$) oscillates occurs when the electronic device 1 increases the reference current ($I_{ref}$) from the first value (e.g., 0.1A) to the second value (e.g., 0.2A), the electronic device 1 may set the reference current ($I_{ref}$) to a value greater than or equal to the first value (e.g., 0.1A) and less than the second value (e.g., 0.2A), and may gradually decrease the set value of the reference current ($I_{ref}$) until the phenomenon in which the output current ($I_{out}$) oscillates does not occur. According to an embodiment, if the charging circuit 207 is configured to perform a bypass function or includes an LDO regulator, although the reference current ($I_{ref}$) is increased to the second value, an output current ($I_{out}$) does not oscillate as in the interval after the second point ($t_2$) of FIG. 3B and the output current ($I_{out}$) may be limited to a value less than or equal to the set value (e.g., the second value) of the reference current ($I_{ref}$).

Figure 4:
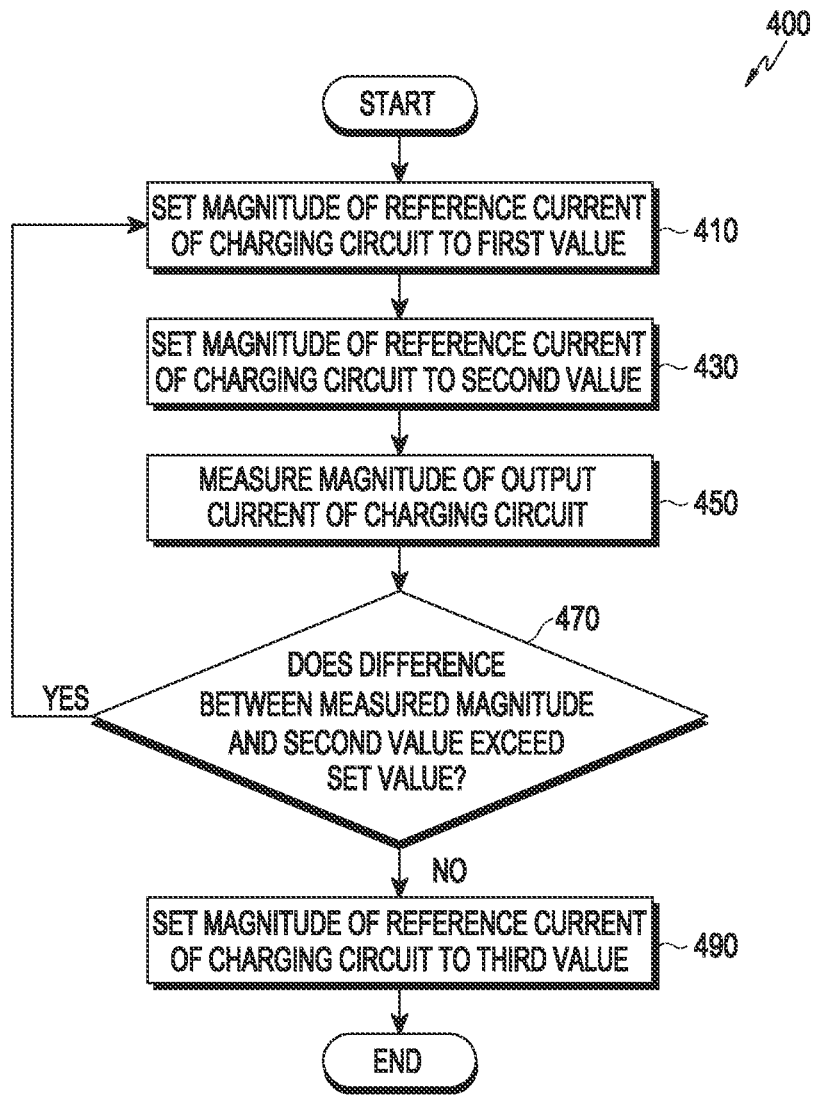
FIG. 4 is a flowchart illustrating an example method of determining a set value of a reference current by an electronic device according to various embodiments.

FIG. 4 is a flowchart 400 illustrating an example method in which an electronic device (e.g., the electronic device 101 of FIG. 1B) determines a set value for a reference current (e.g., a reference current ($I_{ref}$) of FIG. 2) according to various embodiments. Hereinafter, descriptions which have been provided with reference to the above-described drawings may not be repeated.

According to various embodiments, the electronic device 101 may set the magnitude of the reference current ($I_{ref}$) of a charging circuit (e.g., the charging circuit 207 of FIG. 2) to a first value in operation 410. For example, the first value may be a value less than the maximum value of an output current ($I_{out}$) which the charging circuit 207 is capable of outputting. According to various embodiments, the electronic device 101 may transmit a control signal having a reference current ($I_{ref}$) of the first value to the charging circuit 207, and the charging circuit 207 may output an output current (e.g., an output current ($I_{out}$) of FIG. 2) corresponding to (proportional to) the first value, and may provide the output current to the battery (e.g., the battery 211 of FIG. 2).

According to various embodiments, the electronic device 101 may set the magnitude of the reference current ($I_{ref}$) of the charging circuit 207 to a second value in operation 430. For example, the second value may be a value greater than the first value. According to various embodiments, the electronic device 101 may transmit a control signal having a reference current ($I_{ref}$) of the second value to the charging circuit 207, and the charging circuit 207 may be configured to output an output current ($I_{out}$) corresponding to (proportional to) the second value.

According to various embodiments, the electronic device 101 may measure the magnitude of an output current ($I_{out}$) of the charging circuit 207 in operation 450. For example, the electronic device 101 may measure and identify the magnitude of an output current ($I_{out}$) using a sensor (e.g., the sensor 209 of FIG. 2) included in the charging circuit 207 or a sensor (e.g., the sensor 209 of FIG. 2) disposed outside the charging circuit 207.

According to various embodiments, the electronic device 101 may identify whether the difference between the measured magnitude and the second value exceeds a predetermined (specified) set value in operation 470. For example, the electronic device 101 may identify the average value of the measured magnitude of the output current ($I_{out}$), and may identify whether the difference between the identified average value and the second value exceeds the set value. As another example, the electronic device 101 may measure magnitudes of output current ($I_{out}$) at a plurality of points, and may identify whether a magnitude of which the difference from the second value exceeds the set value is present among the measured magnitudes.

According to various embodiments, if it is not identified that the difference between the measured magnitude and the second value exceeds the set value (470—No), the electronic device 101 may set the magnitude of the reference current ($I_{ref}$) of the charging circuit 207 to a third value in operation 490. For example, the third value may be a value greater than the first value and the second value. According to various embodiments, after operation 490, the electronic device may measure the magnitude of an output current ($I_{out}$) again, and if it is not identified that the difference between the measured magnitude and the third value exceeds the set value, the electronic device may set the reference current ($I_{ref}$) to a fourth value which is greater than the third value.

According to various embodiments, if it is identified that the difference between the measured magnitude and the second value exceeds the set value (470—Yes), the electronic device 101 may perform operation 410 again to set the magnitude of the reference current ($I_{ref}$) of the charging circuit 207 to the first value which is less than the second value. In other words, if it is identified that the difference between the measured magnitude and the second value exceeds the set value, the electronic device 101 may decrease the magnitude of the reference current ($I_{ref}$) to the first value which is the set value of a previous stage before the difference between the measured magnitude and the second value is identified as exceeding the set value.

According to various embodiments, when increasing the reference current ($I_{ref}$) (e.g., from the second value to a third value), the electronic device 101 may gradually increase (e.g., stage by stage) the reference current ($I_{ref}$) of a control signal sent to the charging circuit 207 from an initial value (e.g., the first value). For example, in the state in which the reference current ($I_{ref}$) is set to the second value, in order to change the reference current ($I_{ref}$) from the second value to the third value, the electronic device 101 may transmit a control signal having a reference current ($I_{ref}$) of the first value to the charging circuit 207, may transmit a control signal having a reference current ($I_{ref}$) of the second value to the charging circuit 207, and may transmit a control signal having a reference current ($I_{ref}$) of the third value to the charging circuit 207. According to various embodiments, regarding the case of decreasing the reference current ($I_{ref}$) (from the third value to the second value), in the state in which the reference current ($I_{ref}$) is set to the third value, in order to change the reference current ($I_{ref}$) from the third value to the second value, the electronic device 101 may transmit a control signal having a reference current ($I_{ref}$) of the first value to the charging circuit 207, and may transmit a control signal having a reference current ($I_{ref}$) of the second value to the charging circuit 207.

Figure 5A:
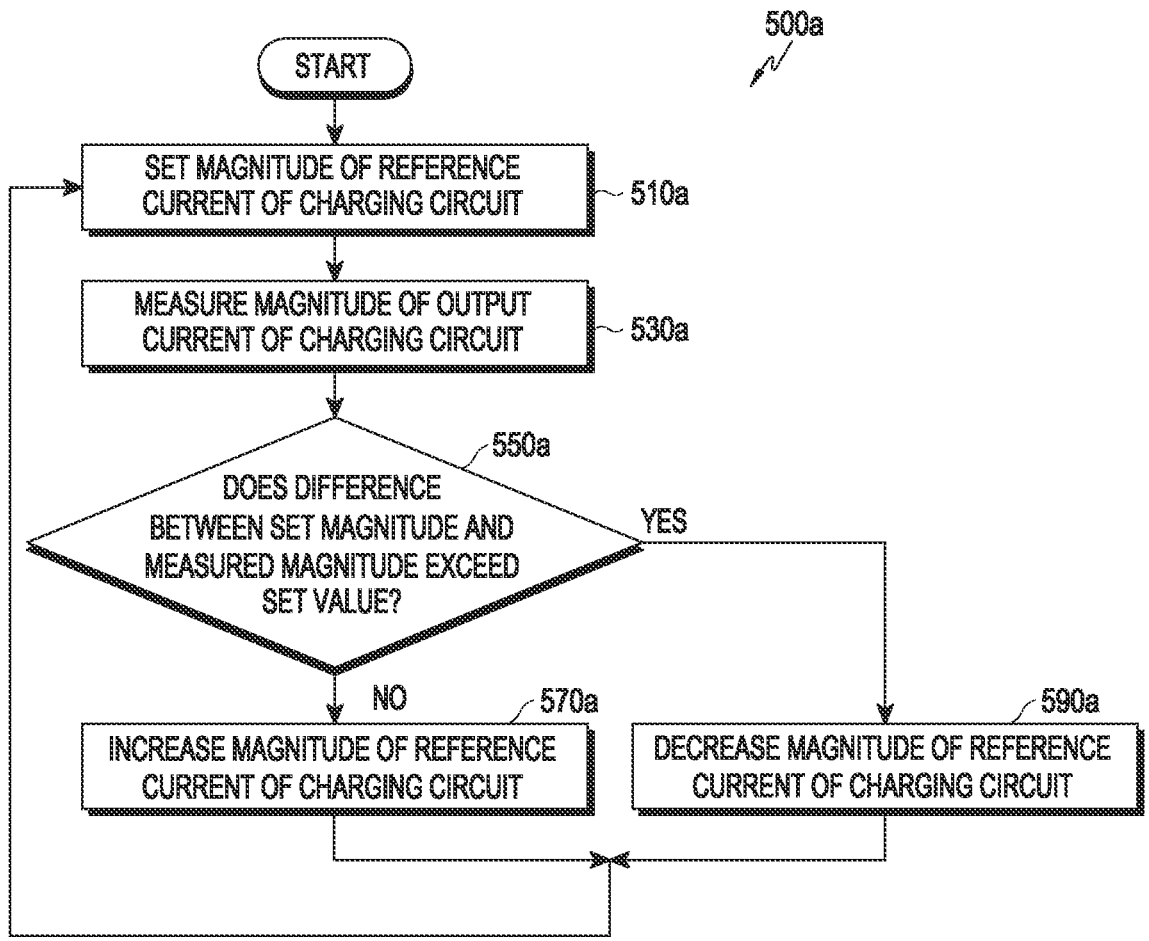
FIG. 5A is a flowchart illustrating an example method of determining a set value of a reference current by an electronic device according to various embodiments.

FIG. 5A is a flowchart 500a illustrating an example method in which an electronic device (e.g., the electronic device 101 of FIG. 1B) determines a set value for a reference current (e.g., a reference current ($I_{ref}$) of FIG. 2), according to various embodiments. Hereinafter, descriptions which have been provided with reference to the above-described drawings may not be repeated.

According to various embodiments, the electronic device 101 may set the magnitude of a reference current ($I_{ref}$) of a charging circuit (e.g., the charging circuit 207 of FIG. 2) in operation 510a.

According to various embodiments, the electronic device 101 may measure the magnitude of an output current (an output current ($I_{out}$) of FIG. 2) of the charging circuit 207 in operation 530a. For example, the electronic device 101 may measure and identify the magnitude of an output current ($I_{out}$) using a sensor (not illustrated) included in the charging circuit 207 or a sensor (e.g., the sensor 209 of FIG. 2) disposed outside the charging circuit 207.

According to various embodiments, the electronic device 101 may identify whether the difference between the magnitude set in operation 550a and the measured magnitude exceeds a set value.

According to various embodiments, if it is not identified that the difference between the set magnitude and the measured magnitude exceeds the set value (550a—No), the electronic device 101 may increase the magnitude of the reference current ($I_{ref}$) of the charging circuit 207 in operation 570a. For example, if the magnitude of the reference current ($I_{ref}$) set in operation 510a is a first value, the electronic device 101 may set the magnitude of the reference current ($I_{ref}$) of the charging circuit 207 to a second value which is greater than the first value in operation 570a. It is merely an example that the magnitude of the reference current ($I_{ref}$) set in operation 510a is the first value, and if the magnitude of the set reference current ($I_{ref}$) is the second value, operation 570a of the electronic device 101 may be an operation of setting the magnitude of the reference current ($I_{ref}$) of the charging circuit 207 to a third value which is greater than the second value.

According to various embodiments, if it is identified that the difference between the set magnitude and the measured magnitude exceeds the set value (550a—Yes), the electronic device 101 may decrease the magnitude of the reference current ($I_{ref}$) of the charging circuit 207 in operation 590a. For example, if the magnitude of the reference current ($I_{ref}$) set in operation 510a is the second value, the electronic device 101 may set the magnitude of the reference current ($I_{ref}$) of the charging circuit 207 to the first value which is less than the second value in operation 590a. It is merely an example that the magnitude of the reference current ($I_{ref}$) set in operation 510a is the second value, and if the magnitude of the set reference current ($I_{ref}$) is the third value, operation 590a of the electronic device 101 may be an operation of setting the magnitude of the reference current ($I_{ref}$) of the charging circuit 207 to the second value which is less than the third value.

According to various embodiments, the electronic device 101 may perform operation 570a or operation 590a, may perform operation 530a again, and may measure the magnitude of an output current ($I_{out}$) of the charging circuit 207 again, and may perform at least one of operations 550a to 590a again.

As described above, the electronic device 101 may compare the magnitude of a measured output current ($I_{out}$) and the magnitude of a set reference current ($I_{ref}$), and may gradually (e.g., stage by stage) increase or decrease the magnitude of the reference current ($I_{ref}$).

Figure 5B:
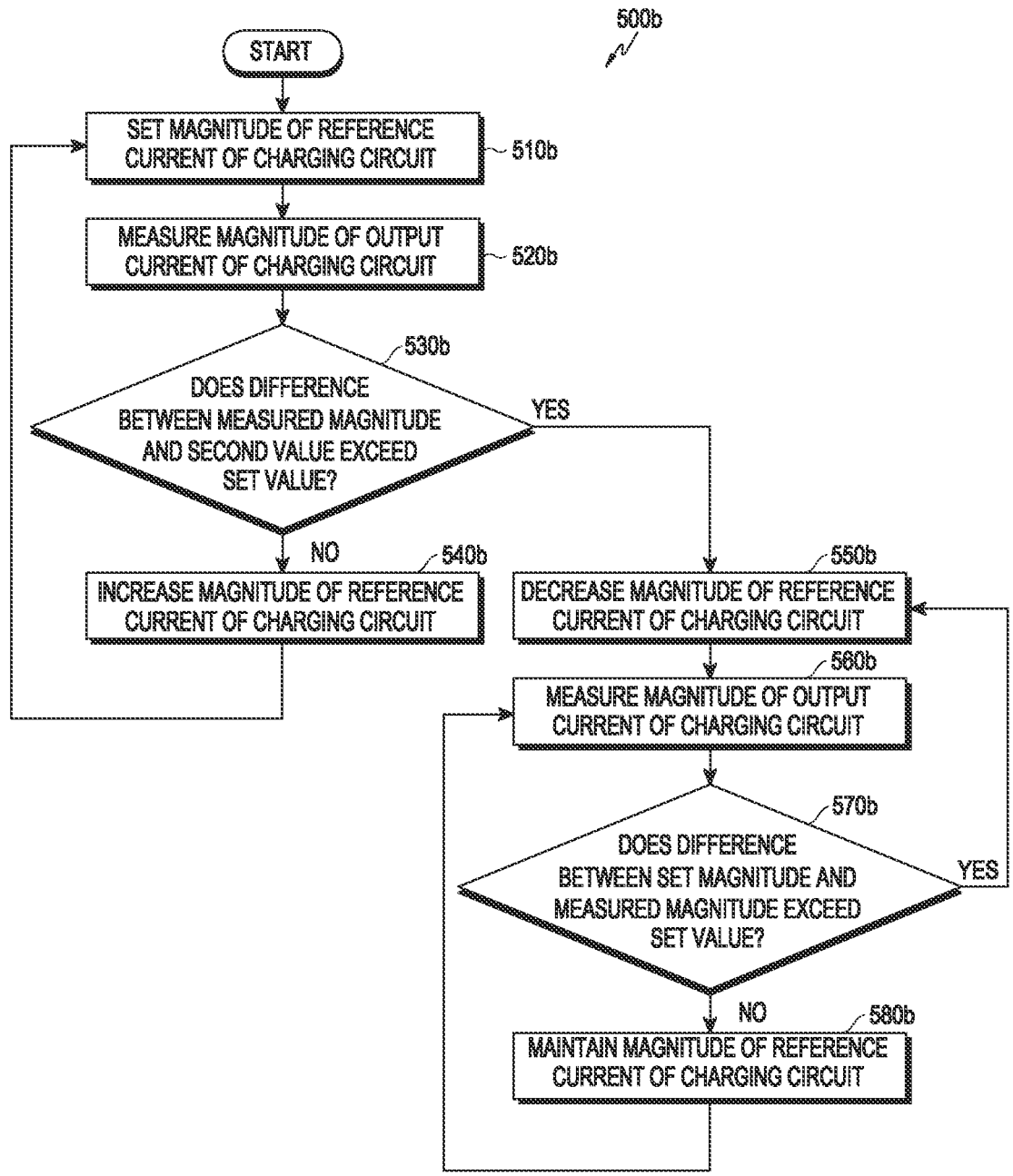
FIG. 5B is a flowchart illustrating an example method of determining a set value of a reference current by an electronic device according to various embodiments.

FIG. 5B is a flowchart 500b illustrating an example method in which an electronic device (e.g., the electronic device 101 of FIG. 1B) determines a set value for a reference current (e.g., a reference current ($I_{ref}$) of FIG. 2) according to various embodiments. Hereinafter, descriptions which have been provided with reference to the above-described drawings (e.g., FIG. 5A) may not be repeated.

According to various embodiments, the electronic device 101 may set the magnitude of a reference current ($I_{ref}$) of a charging circuit (e.g., the charging circuit 207 of FIG. 2) in operation 510b.

According to various embodiments, the electronic device 101 may measure the magnitude of an output current (an output current ($I_{out}$) of FIG. 2) of the charging circuit 207 in operation 520b. For example, the electronic device 101 may measure and identify the magnitude of an output current ($I_{out}$) using a sensor (not illustrated) included in the charging circuit 207 or a sensor (e.g., the sensor 209 of FIG. 2) disposed outside the charging circuit 207.

According to various embodiments, the electronic device 101 may identify whether the difference between the set magnitude and the measured magnitude exceeds a set value in operation 530b.

According to various embodiments, if it is not identified that the difference between the set magnitude and the measured magnitude exceeds the set value (530b—No), the electronic device 101 may increase the magnitude of the reference current ($I_{ref}$) of the charging circuit 207 in operation 540b. For example, if the magnitude of the reference current ($I_{ref}$) set in operation 510b is a first value, the electronic device 101 may set the magnitude of the reference current ($I_{ref}$) of the charging circuit 207 to a second value which is greater than the first value in operation 540b. It is merely an example that the magnitude of the reference current ($I_{ref}$) set in operation 510b is the first value, and if the magnitude of the set reference current ($I_{ref}$) is the second value, operation 540b of the electronic device 101 may be an operation of setting the magnitude of the reference current ($I_{ref}$) of the charging circuit 207 to a third value which is greater than the second value.

According to various embodiments, if it is identified that the difference between the set magnitude and the measured magnitude exceeds the set value (530b—Yes), the electronic device 101 may decrease the magnitude of the reference current ($I_{ref}$) of the charging circuit 207 in operation 550b. For example, if the magnitude of the reference current ($I_{ref}$) set in operation 510b is the second value, the electronic device 101 may set the magnitude of the reference current ($I_{ref}$) of the charging circuit 207 to the first value which is less than the second value in operation 550b. It is merely an example that the magnitude of the reference current ($I_{ref}$) set in operation 510b is the second value, and if the magnitude of the set reference current ($I_{ref}$) is the third value, operation 550b of the electronic device 101 may be an operation of setting the magnitude of the reference current ($I_{ref}$) of the charging circuit 207 to the second value which is less than the third value.

According to various embodiments, the electronic device 101 may measure the magnitude of an output current ($I_{out}$) of the charging circuit 207 in operation 560b.

According to various embodiments, the electronic device 101 may identify whether the difference between the set magnitude and the measured magnitude exceeds the set value in operation 570b. For example, the electronic device 101 may identify whether the difference between the magnitude of the reference current ($I_{ref}$) set in operation 550b and the magnitude of the output current ($I_{out}$) measured in operation 560b exceeds the set value.

According to various embodiments, based on a result of operation 570b, if it is identified that the difference between the set magnitude and the measured magnitude exceeds the set value (570b—Yes), the electronic device 101 may perform operation 550b again and may decrease the magnitude of the reference current ($I_{ref}$) of the charging circuit 207. For example, if the magnitude of the reference current ($I_{ref}$) set in operation 550b is the second value, operation 550b that the electronic device 101 performs again may an operation of setting the magnitude of the reference current ($I_{ref}$) of the charging circuit 207 to the first value which is less than the second value. According to various embodiments, if the magnitude of the reference current ($I_{ref}$) set in operation 550b is the minimum set value (e.g., the first value), the electronic device 101 may not decrease the magnitude of the reference current ($I_{ref}$) any longer (e.g., may maintain the magnitude of the reference current ($I_{ref}$)).

According to various embodiments, based on a result of performing operation 570b, if it is not identified that the difference between the set magnitude and the measured magnitude exceeds the set value (570b—No), the electronic device 101 may maintain the magnitude of the reference current ($I_{ref}$) in operation 580b.

According to various embodiments, the electronic device 101 may perform operation 580b, may perform operation 560b again, and may measure the magnitude of the output current ($I_{out}$) of the charging circuit 207 again, and may perform operation 570b again.

According to various embodiments, while performing at least one of operations 550b to operation 580b, the electronic device 101 may perform, based on a rectifying voltage (e.g., the rectifying voltage ($V_{rec}$) of FIG. 2), at least one of operations 520b to 540b. For example, if the electronic device 101 approaches a wireless power transmitting unit (e.g., the wireless power transmitting unit 1 of FIG. 1A) (e.g., the distance (d) of FIG. 1A is decreased), power receivable by a resonant circuit (e.g., the resonant circuit 201 of FIG. 2) is increased and the magnitude of the rectifying voltage ($V_{rec}$) is increased. Accordingly, power transferred to a load (e.g., the charging circuit 207) may be increased. The electronic device 101 (e.g., the controller 213 of FIG. 2) identifies the rectifying voltage ($V_{rec}$), and if it is identified that the rectifying voltage ($V_{rec}$) is increased by at least a predetermined (specified) magnitude, the electronic device 101 performs operation 520b or operation 530b, and may increase the magnitude of the reference current ($I_{ref}$) of the charging circuit 207. Alternatively, the electronic device 101 (e.g., the controller 213) identifies the rectifying voltage ($V_{rec}$), and if it is identified that the rectifying voltage ($V_{rec}$) is increased by at least a predetermined (specified) magnitude, the electronic device 101 may increase the magnitude of the reference current ($I_{ref}$) of the charging circuit 207 without performing operation 520b or operation 530b. In addition to the above-described example in which the magnitude of the rectifying voltage ($V_{rec}$) is increased, the magnitude of the rectifying voltage ($V_{rec}$) may be increased when the number of electronic devices that wirelessly receive power is decreased while a plurality of electronic devices including the electronic device 101 are wirelessly receiving power from the wireless power transmitting unit 1. In this instance, as described above, based on the rectifying voltage (e.g., the rectifying voltage ($V_{rec}$) of FIG. 2), at least one of operations 520b to 540b may be performed.

Figure 6:
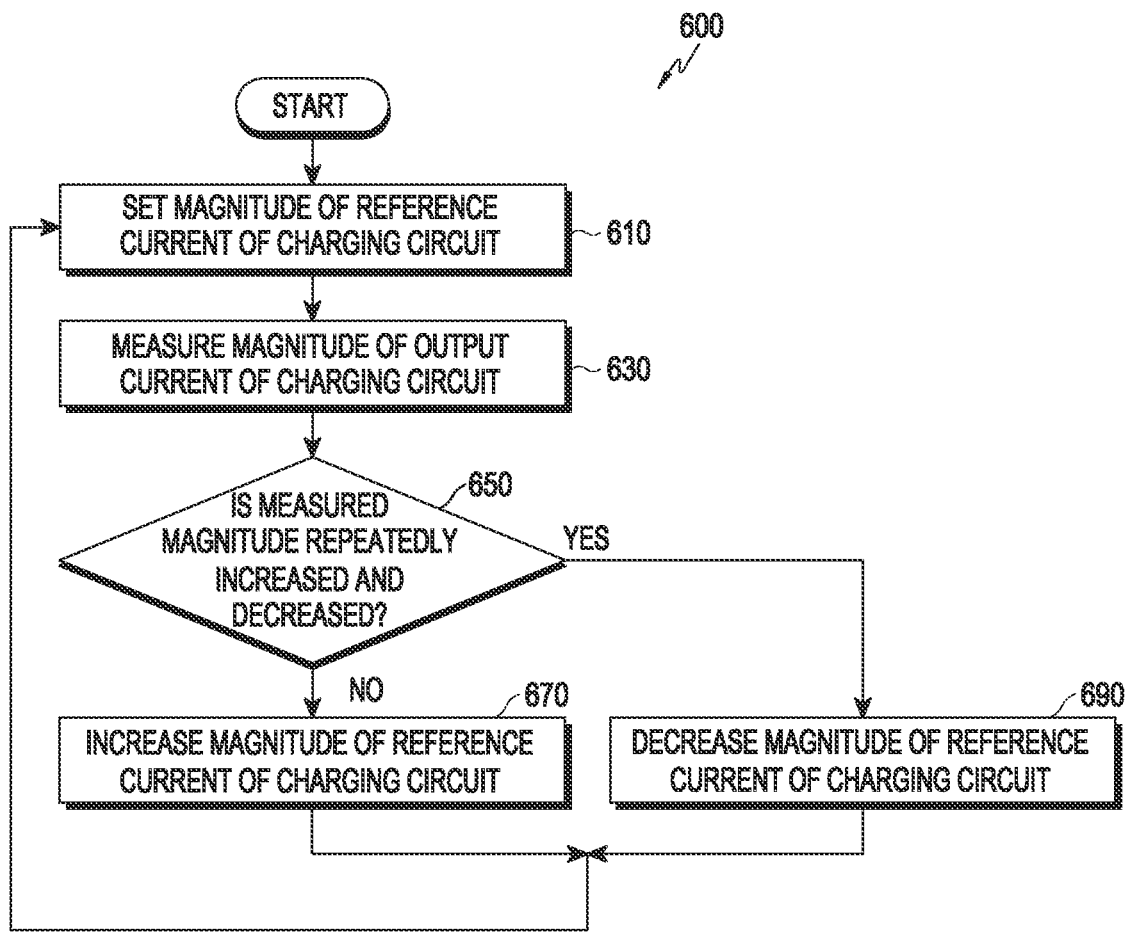
FIG. 6 is a flowchart illustrating an example method of determining a set value of a reference current by an electronic device according to various embodiments.

FIG. 6 is a flowchart 600 illustrating an example method in which an electronic device (e.g., the electronic device 101 of FIG. 1B) determines a set value for a reference current (e.g., a reference current ($I_{ref}$) of FIG. 2) according to various embodiments. Hereinafter, descriptions which have been provided with reference to the above-described drawings may not be repeated.

According to various embodiments, the electronic device 101 may set the magnitude of a reference current ($I_{ref}$) of a charging circuit (e.g., the charging circuit 207 of FIG. 2) in operation 610.

According to various embodiments, the electronic device 101 may measure the magnitude of an output current (an output current ($I_{out}$) of FIG. 2) of the charging circuit 207 in operation 630. For example, the electronic device 101 may measure and identify the magnitude of an output current ($I_{out}$) using a sensor (not illustrated) included in the charging circuit 207 or a sensor (e.g., the sensor 209 of FIG. 2) disposed outside the charging circuit 207.

According to various embodiments, the electronic device 101 may identify whether the measured magnitude is repeatedly increased and decreased in operation 650. For example, the measured output current ($I_{out}$) being repeatedly increased and decreased may indicate that a current (e.g., an output current ($I_{out}$)) provided from the charging circuit 207 to a battery (e.g., the battery 211 of FIG. 2) oscillates(e.g., oscillation). According to various embodiments, the electronic device 101 may identify whether a high-frequency component of an output current ($I_{out}$) which passes a high-pass filter (HPF) included in the sensor 209 is present, and if the high-frequency component is present, the electronic device 101 may identify that the measured magnitude is repeatedly increased and decreased.

According to various embodiments, if it is not identified that the measured magnitude is repeatedly increased and decreased (650—No), the electronic device 101 may increase the magnitude of the reference current ($I_{ref}$) of the charging circuit 207 in operation 670. For example, if the magnitude of the reference current ($I_{ref}$) set in operation 610 is a first value, the electronic device 101 may set the magnitude of the reference current ($I_{ref}$) of the charging circuit 207 to a second value which is greater than the first value in operation 670. It is merely an example that the magnitude of the reference current ($I_{ref}$) set in the operation 610 is the first value, and if the magnitude of the set reference current ($I_{ref}$) is the second value, operation 670 of the electronic device 101 may be an operation of setting the magnitude of the reference current ($I_{ref}$) of the charging circuit 207 to a third value which is greater than the second value.

According to various embodiments, if it is identified that the measured magnitude is repeatedly increased and decreased (650—Yes), the electronic device 101 may decrease the magnitude of the reference current ($I_{ref}$) of the charging circuit 207 in operation 690. For example, if the magnitude of the reference current ($I_{ref}$) set in operation 610 is the second value, the electronic device 101 may set the magnitude of the reference current ($I_{ref}$) of the charging circuit 207 to the first value which is less than the second value in operation 690. It is merely an example that the magnitude of the reference current ($I_{ref}$) set in operation 610 is the second value, and if the magnitude of the set reference current ($I_{ref}$) is the third value, operation 690 of the electronic device 101 may be an operation of setting the magnitude of the reference current ($I_{ref}$) of the charging circuit 207 to the second value which is less than the third value.

According to various embodiments, the electronic device 101 may perform operation 670 or operation 690, may perform operation 630 again, may measure the magnitude of the output current ($I_{out}$) of the charging circuit 207 again, and may perform at least one of operations 650 to 690 again.

According to various embodiments, if it is not identified that the magnitude of the measured output current ($I_{out}$) is repeatedly increased and decreased by performing operation 690, and performing operations 630 and 650 again, the electronic device 101 may maintain the magnitude of the reference current ($I_{ref}$) of the charging circuit 207.

According to various embodiments, based on a rectifying voltage (e.g., a rectifying voltage ($V_{rec}$) of FIG. 2), the electronic device 101 may perform at least one of operations 630 to 670. As described with reference to FIG. 5B, the electronic device 101 identifies the rectifying voltage ($V_{rec}$), and if it is identified that the rectifying voltage ($V_{rec}$) is increased by at least a predetermined (specified) magnitude, the electronic device 101 may perform operation 630 or operation 650, and may increase the magnitude of the reference current ($I_{ref}$) of the charging circuit 207. The electronic device 101 identifies a rectifying voltage ($V_{rec}$), and if it is identified that the rectifying voltage ($V_{rec}$) is increased by at least a predetermined (specified) magnitude, the electronic device 101 may increase the magnitude of the reference current ($I_{ref}$) of the charging circuit 207 without performing operation 630 or operation 650.

As described above, the electronic device 101 may identify whether the measured magnitude is repeatedly increased and decreased, and may gradually (e.g., stage by stage) increase or decrease the magnitude of the reference current ($I_{ref}$).

Figure 7:
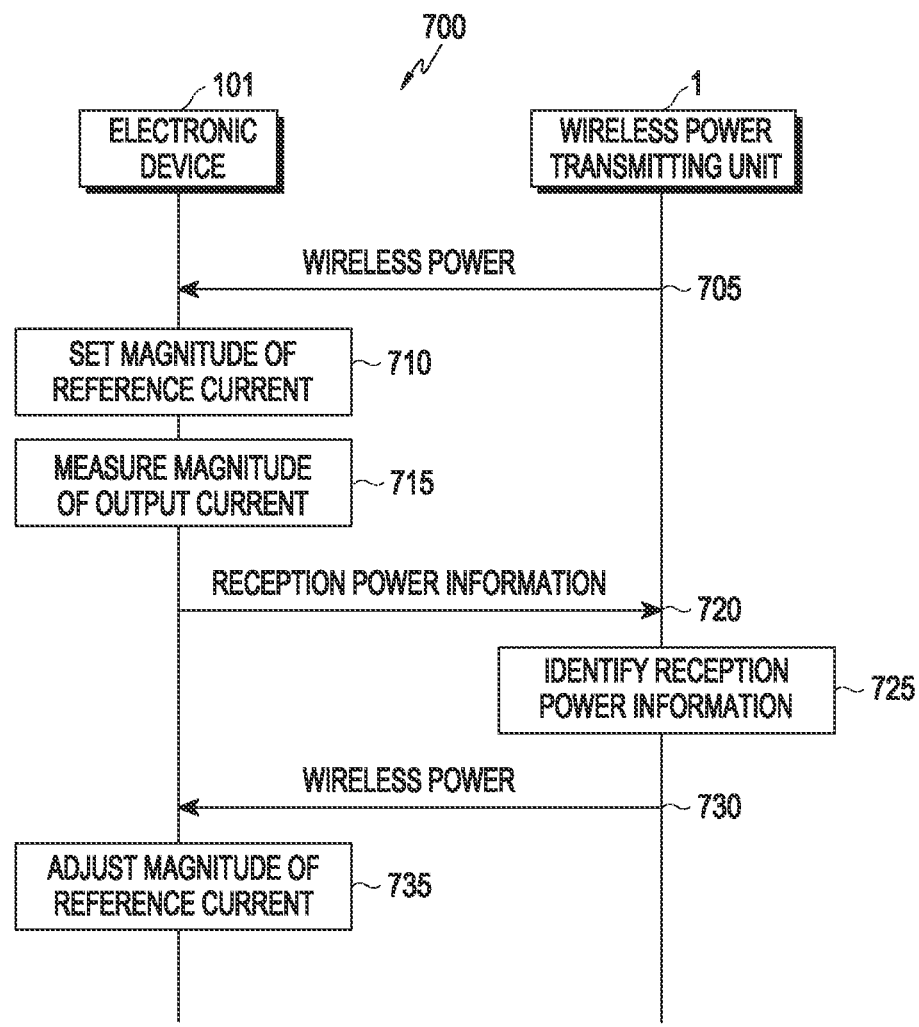
FIG. 7 is a signal flow diagram illustrating an example method of determining, by an electronic device, a set value of a reference current and/or transmitting reception power information to a wireless power transmitting unit according to various embodiments.

FIG. 7 is a signal flow diagram 700 illustrating an example method in which the electronic device 101 determines a set value for a reference current (e.g., the reference current ($I_{ref}$) of FIG. 2) and/or transmits reception power information to the wireless power transmitting unit 1 according to various embodiments. Hereinafter, descriptions which have been provided with reference to the above-described drawings may not be repeated.

According to various embodiments, the electronic device 101 may receive, from the wireless power transmitting unit 1, wireless power transmitted from the wireless power transmitting unit 1 in operation 705.

According to various embodiments, the electronic device 101 may set the magnitude of the reference current ($I_{ref}$) in operation 710. According to various embodiments, operation 710 may be performed while wireless power is received from the wireless power transmitting unit 1.

According to various embodiments, the electronic device 101 may measure the magnitude of an output current (an output current ($I_{out}$) of FIG. 2) in operation 715. For example, the electronic device 101 may measure and identify the magnitude of an output current ($I_{out}$) using a sensor (not illustrated) included in the charging circuit (e.g., the charging circuit 207 of FIG. 2) or a sensor (e.g., the sensor 209 of FIG. 2) disposed outside the charging circuit 207.

According to various embodiments, the electronic device 101 may transmit reception power information to the wireless power transmitting unit 1 in operation 720. For example, the reception power information may include at least one piece of information among information (e.g., the magnitude of an output current ($I_{out}$)) associated with the measured output current ($I_{out}$) of the charging circuit 207 and information indicating that a phenomenon (e.g., oscillation) in which the output current ($I_{out}$) oscillates occurs.

According to various embodiments, the wireless power transmitting unit 1 may receive reception power information from the electronic device 101, and may identify the received reception power information in operation 725.

According to various embodiments, the wireless power transmitting unit 1 may transmit wireless power in operation 730, and the transmitted wireless power may be received by the electronic device 101. According to various embodiments, based on the identified wireless power information, the wireless power transmitting unit 1 may transmit wireless power having a magnitude different from that of the wireless power in operation 705. For example, based on a result of identifying the reception power information, if it is identified that the magnitude of the output current ($I_{out}$) does not correspond to a set value (one of a first value, a second value, or a third value), or if it is identified that a phenomenon (e.g., oscillation) in which the output current ($I_{out}$) oscillates occurs, the wireless power transmitting unit 1 may increase the magnitude of wireless power to be transmitted and may transmit the wireless power in the increased magnitude. For example, increase in the magnitude of the wireless power may be performed within a range of wireless power which the wireless power transmitting unit 1 is capable of transmitting. According to various embodiments, the wireless power transmitting unit 1 may transmit wireless power having a magnitude identical to that of the wireless power of operation 705 in operation 730.

According to various embodiments, the electronic device 101 may receive wireless power transmitted by the wireless power transmitting unit 1, and may adjust (e.g., change) the magnitude of the reference current ($I_{ref}$) in operation 735. For example, the electronic device 101 may measure the magnitude of an output current ($I_{out}$) (e.g., operation 450 of FIG. 4, operation 530a of FIG. 5A, or operation 520b or operation 560b of FIG. 5B) while receiving wireless power transmitted from the wireless power transmitting unit 1 in operation 730 in the state of transmitting the reference current ($I_{ref}$) set in operation 710 to the charging circuit 207, and may compare the measured magnitude and the set magnitude of the reference current ($I_{ref}$) (e.g., operation 470 of FIG. 4, operation 550a of FIG. 5A, or operation 530b or operation 570b of FIG. 5B). Based on a comparison result, the electronic device 101 may increase, maintain, or decrease the magnitude of the reference current ($I_{ref}$). As another example, the electronic device 101 may identify whether the magnitude of an output current ($I_{out}$) is repeatedly increased and decreased (e.g., operation 650 of FIG. 6), and may increase or decrease the magnitude of the reference current ($I_{ref}$) based on a result of the identification. According to various embodiments, if the difference between the measured magnitude of the output current ($I_{out}$) and the set magnitude of the reference current ($I_{ref}$) does not exceed a set value, or if it is not identified that the magnitude of the output current ($I_{out}$) is repeatedly increased and decreased, the electronic device 101 may maintain the magnitude of the reference current ($I_{ref}$) (e.g., a set value).

Figure 8:
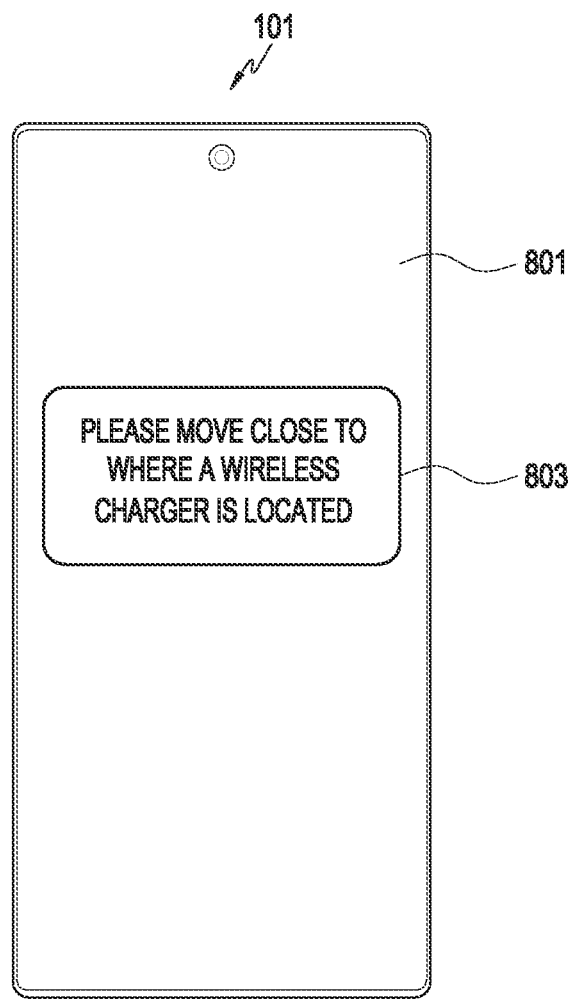
FIG. 8 is a diagram illustrating an example of a screen displayed in an electronic device when an output current oscillates according to various embodiments.

FIG. 8 is a diagram illustrating an example of a screen displayed in the electronic device 101 when an output current (e.g., an output current ($I_{out}$) of FIG. 2) oscillates, according to various embodiments.

Referring to FIG. 8, the electronic device 101 may measure the magnitude of an output current (e.g., an output current ($I_{out}$) of FIG. 2) while wirelessly receiving power from a wireless power transmitting unit (e.g., the wireless power transmitting unit 1 of FIG. 1A), and if it is identified that the difference between the measured magnitude of the output current ($I_{out}$) and a set magnitude of a reference current (e.g., the reference current ($I_{out}$) of FIG. 2) exceeds a set value, or the measured magnitude of the output current ($I_{out}$) is identified as being repeatedly increased and decreased, the electronic device 101 may display a notification message 803 on a display 801 (e.g., the display module 160 of FIG. 1B). According to various embodiments, the displayed notification message 803 may include text (e.g., "please move close to where a wireless charger is located") that prompts movement of the electronic device 101. The text included in the notification message 803 illustrated in FIG. 8 is merely an example, and may include other text and/or images. According to various embodiments, if power (or a current) that a charging circuit (e.g., the charging circuit 207 of FIG. 2) outputs to a battery (e.g., the battery 211 of FIG. 2) does not exceed power wirelessly received from the wireless power transmitting unit 1 (e.g., the maximum power that the resonant circuit 201 of FIG. 2 is capable of receiving) since the electronic device 101 moves, the electronic device 101 may suspend displaying the notification message 803.

According to various example embodiments, an electronic device (e.g., the electronic device 101 of FIG. 2) may include: a battery (e.g., the battery 211 of FIG. 2), a resonant circuit (e.g., the resonant circuit 201 of FIG. 2) including a coil and a capacitor configured to wirelessly receive power, a rectifying circuit (e.g., the rectifying circuit 203 of FIG. 2) configured to rectify an alternating current power provided from the resonant circuit to a direct current power, a DC/DC converter (e.g., the DC/DC converter 205 of FIG. 2) configured to convert the direct current power provided from the rectifying circuit and to output the converted direct current power, a charging circuit (e.g., the charging circuit 207 of FIG. 2) configured to charge the battery using the converted direct current power provided form the DC/DC converter, a controller (e.g., the controller 213 of FIG. 2), and a communication circuit (e.g., the communication circuit 215 of FIG. 2), wherein the controller is configured to: control the charging circuit to set a magnitude of a reference current of the charging circuit to a first value, the first value being less than a maximum value of an output current of the charging circuit, control the charging circuit to set a magnitude of the reference current to a second value greater than the first value, and measure a magnitude of an output current of the charging circuit after setting the magnitude of the reference current to the second value, control, based on a difference between the measured magnitude and the second value being less than or equal to a specified set value, the charging circuit to set the magnitude of the reference current to a third value greater than the second value, and control, based on the difference between the measured magnitude and the second value exceeding the set value, the charging circuit to set the magnitude of the reference current to the first value to receive wireless power.

According to various example embodiments, the controller may be further configured to measure the magnitude of the output current, to identify an average value of the measured magnitude, and to identify whether a difference between the identified average value and the second value exceeds a specified set value.

According to various example embodiments, the controller may be further configured to: measure the magnitude of the output current of the charging circuit after setting the magnitude of the reference current to the third value, and control, based on the difference between the measured magnitude and the third value exceeding the specified set value, the charging circuit to set the magnitude of the reference current to the second value.

According to various example embodiments, the charging circuit may be configured to output the output current proportional to the magnitude of the reference current set by the controller.

According to various example embodiments, the electronic device may further comprise a sensor, wherein the output current may be measured by the sensor disposed between an output end of the charging circuit and the battery.

According to various example embodiments, the magnitude of the output current may be repeatedly increased and decreased based on the reference current having a magnitude greater than or equal to a threshold value being received by the charging circuit while the wireless power is received from a wireless power transmitting unit.

According to various example embodiments, the threshold value may be determined based on a voltage of an output end of the rectifying circuit while the reference current is received by the charging circuit.

According to various example embodiments, the output current may include a current provided to the battery for charging the battery.

According to various example embodiments, the controller may be further configured to: based on the difference between the measured magnitude and the magnitude of the second value exceeding the specified set value, transmit information associated with the magnitude of the output current to the wireless power transmitting unit using the communication circuit.

According to various example embodiments, wireless power received from the wireless power transmitting unit may be increased based on the transmission of the information associated with the magnitude of the output current.

According to various example embodiments, a method of controlling an electronic device may include: controlling the charging circuit to set a magnitude of a reference current of a charging circuit of the electronic device to a first value, the first value being less than a maximum value of an output current of the charging circuit, controlling the charging circuit to set the magnitude of the reference current to a second value greater than the first value, measuring a magnitude of an output current of the charging circuit after setting the magnitude of the reference current to the second value, controlling, based on a difference between the measured magnitude and the second value being less than or equal to a specified set value, the charging circuit to set the magnitude of the reference current to a third value greater than the second value, and controlling, based on the difference between the measured magnitude and the second value exceeding the specified set value, the charging circuit to set the magnitude of the reference current to the first value to receive wireless power.

According to various example embodiments, the measuring the magnitude of the output current of the charging circuit may include: measuring the magnitude of the output current and identifying an average value of the measured magnitude, and the method of controlling the electronic device may further include identifying whether the difference between the identified average value and the second value exceeds a specified set value.

According to various example embodiments, the method of controlling the electronic device may further include: controlling the charging circuit to set the magnitude of the reference current to the third value, measuring the magnitude of the output current of the charging circuit, and controlling, based on a difference between the measured magnitude and the third value exceeding the specified set value, the charging circuit to set the magnitude of the reference current to the second value.

According to various example embodiments, the method of controlling the electronic device may further include outputting the output current, the output current being proportional to a set magnitude of the reference current.

According to various example embodiments, the magnitude of the output current may be repeatedly increased and decreased based on the reference current having a magnitude greater than or equal to a threshold value being received by the charging circuit while the wireless power is received from a wireless power transmitting unit.

According to various example embodiments, the threshold value may be determined based on a voltage of an output end of a rectifying circuit of the electronic device while the reference current is received by the charging circuit.

According to various example embodiments, the output current may include a current provided to the battery for charging the battery of the electronic device.

According to various example embodiments, the method of controlling the electronic device may further include: transmitting, based on the difference between the measured magnitude and the magnitude of the second value exceeding the specified set value, information associated with the magnitude of the output current to a wireless power transmitting unit using a communication circuit of the electronic device.

According to various example embodiments, an electronic device may include: a battery, a resonant circuit including a coil and a capacitor configured to wirelessly receive power, a rectifying circuit configured to rectify an alternating current power provided from the resonant circuit to a direct current power, a DC/DC converter configured to convert the direct current power provided from the rectifying circuit and output the converted direct current power, a charging circuit configured to charge the battery using the converted direct current power provided from the DC/DC converter, a controller, and a communication circuit, wherein the controller may be configured to: transmit a reference current to the charging circuit, identify a magnitude of an output current of the charging circuit measured while the reference current is transmitted, based on an increase and decrease of the output current being repeated based on the magnitude of the reference current being increased, transmit a reference current having a decreased magnitude to the charging circuit, and based on an increase and decrease of the output current not being repeated based on the magnitude of the reference current being increased, transmit a reference current having an increased magnitude to the charging circuit.

According to various example embodiments, the electronic device may further include: a high-pass filter (HPF) electrically connected to the charging circuit, and the controller may be further configured to: identify whether a high frequency component of the output current output from the HPF is present, and based on the high frequency component being identified as being present, the output current is identified as being repeatedly increased and decreased.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a battery;
a resonant circuit including a coil and a capacitor configured to wirelessly receive power;
a rectifying circuit configured to rectify an alternating current power provided from the resonant circuit to a direct current power;
a DC/DC converter configured to convert the direct current power provided from the rectifying circuit and to output the converted direct current power;
a charging circuit configured to charge the battery using the converted direct current power provided form the DC/DC converter;
a controller; and
a communication circuit,
wherein the controller is configured to:
control the charging circuit to set a magnitude of a reference current of the charging circuit to a first value, the first value being less than a maximum value of an output current of the charging circuit,
control the charging circuit to set the magnitude of the reference current to a second value greater than the first value, and measure a magnitude of an output current of the charging circuit after setting the magnitude of the reference current to the second value,
control, based on a difference between the measured magnitude of the output current and the second value being less than or equal to a specified set value, the charging circuit to set the magnitude of the reference current to a third value greater than the second value, and
control, based on the difference between the measured magnitude and the second value exceeding the specified set value, the charging circuit to set the magnitude of the reference current to the first value to receive wireless power.

2. The electronic device of claim 1, wherein the controller is further configured to: measure a magnitude of the output current, and to identify an average value of the measured magnitude, and
identify whether a difference between the identified average value and the second value exceeds a specified set value.

3. The electronic device of claim 1, wherein the controller is further configured to: measure a magnitude of an output current of the charging circuit after setting the magnitude of the reference current to the third value, and
control, based on a difference between the measured magnitude of the output current and the third value exceeding the specified set value, the charging circuit to set the magnitude of the reference current to the second value.

4. The electronic device of claim 1, wherein the charging circuit is configured to output the output current, the output current being proportional to the magnitude of the reference current set by the controller.

5. The electronic device of claim 1, further comprising a sensor disposed between an output end of the charging circuit and the battery, wherein the sensor is configured to measure the output current.

6. The electronic device of claim 1, wherein the magnitude of the output current is repeatedly increased and decreased based on the reference current having a magnitude greater than or equal to a threshold value being received by the charging circuit while the wireless power is received from a wireless power transmitting unit.

7. The electronic device of claim 6, wherein the threshold value is determined based on a voltage of an output end of the rectifying circuit while the reference current is received by the charging circuit.

8. The electronic device of claim 1, wherein the output current includes a current provided to the battery for charging the battery.

9. The electronic device of claim 1, wherein the controller is further configured to: based on the difference between the measured magnitude of the output current and a magnitude of the second value exceeding the specified set value, transmit information associated with the magnitude of the output current to a wireless power transmitting unit using the communication circuit.

10. The electronic device of claim 9, wherein wireless power received from the wireless power transmitting unit is increased based on the transmission of the information associated with the magnitude of the output current.

11. A method of controlling an electronic device, the method comprising:
controlling a charging circuit of the electronic device to set a magnitude of a reference current of the charging circuit to a first value, the first value being less than a maximum value of an output current of the charging circuit;
controlling the charging circuit to set a magnitude of the reference current to a second value greater than the first value, and measuring a magnitude of an output current of the charging circuit after setting the magnitude of the reference current to the second value;
controlling, based on a difference between the measured magnitude of the output current and the second value being less than or equal to a specified set value, the charging circuit to set the magnitude of the reference current to a third value greater than the second value; and
controlling, based on the difference between the measured magnitude and the second value exceeding the specified set value, the charging circuit to set the magnitude of the reference current to the first value to receive wireless power.

12. The method of claim 11, wherein the measuring of the magnitude of the output current of the charging circuit comprises: measuring the magnitude of the output current and identifying an average value of the measured magnitude, and
wherein the method further comprises: identifying whether a difference between the identified average value and the second value exceeds a specified set value.

13. The method of claim 11, further comprising:
controlling the charging circuit to set the magnitude of the reference current to the third value, and measuring the magnitude of the output current of the charging circuit; and
controlling, based on a difference between the measured magnitude of the output current and the third value exceeding the specified set value, the charging circuit to set the magnitude of the reference current to the second value.

14. The method of claim 11, further comprising:
outputting the output current, the output current being proportional to a set magnitude of the reference current.

15. The method of claim 11, wherein the magnitude of the output current is repeatedly increased and decreased based on the reference current having a magnitude greater than or equal to a threshold value being received by the charging circuit while the wireless power is received from a wireless power transmitting unit.

16. The method of claim 15, wherein the threshold value is determined based on a voltage of an output end of a rectifying circuit of the electronic device while the reference current is received by the charging circuit.

17. The method of claim 11, wherein the output current includes a current provided to the battery for charging the battery of the electronic device.

18. The method of claim 12, further comprising:
transmitting, based on the difference between the measured magnitude of the output current and a magnitude of the second value exceeding the specified set value, information associated with the magnitude of the output current to a wireless power transmitting unit using a communication circuit of the electronic device.

19. An electronic device comprising:
a battery;
a resonant circuit including a coil and a capacitor configured to wirelessly receive power;
a rectifying circuit configured to rectify an alternating current power provided from the resonant circuit to a direct current power;
a DC/DC converter configured to convert the direct current power provided from the rectifying circuit and output the converted direct current power;
a charging circuit configured to charge the battery using the converted direct current power provided from the DC/DC converter;
a controller; and
a communication circuit,
wherein the controller is configured to:
transmit a reference current to the charging circuit;
identify a magnitude of an output current of the charging circuit measured while the reference current is transmitted;
based on an increase and decrease of the output current being repeated based on a magnitude of the reference current being increased, transmit a reference current having a decreased magnitude to the charging circuit; and
based on an increase and decrease of the output current not being repeated based on the magnitude of the reference current being increased, transmit a reference current having an increased magnitude to the charging circuit.

20. The electronic device of claim 19, further comprising:
a high-pass filter (HPF) electrically connected to the charging circuit,
wherein the controller is further configured to:
identify whether a high frequency component of the output current output from the HPF is present, and
based on the high frequency component being identified as being present, identify the output current as being repeatedly increased and decreased.

* * * * *